(12) United States Patent
Hattori et al.

(10) Patent No.: US 9,493,976 B2
(45) Date of Patent: Nov. 15, 2016

(54) VEHICLE OPENING/CLOSING MEMBER DAMPER APPARATUS AND VEHICLE OPENING/CLOSING MEMBER STOPPER APPARATUS

(75) Inventors: Ryu Hattori, Yokohama (JP); Kenji Morita, Yokohama (JP); Nobuya Shinozaki, Yokohama (JP); Akira Sakata, Wako (JP); Tomoya Yabu, Wako (JP); Hisashi Yamamoto, Wako (JP); Hirokuni Kumekawa, Wako (JP); Toshifumi Gocho, Wako (JP)

(73) Assignees: PIOLAX INC., Yokohama-Shi, Kanagawa (JP); HONDA MOTOR CO., LTD, Tokyo (JP)

( * ) Notice: Subject to any disclaimer, the term of this patent is extended or adjusted under 35 U.S.C. 154(b) by 99 days.

(21) Appl. No.: 14/232,231

(22) PCT Filed: Jun. 22, 2012

(86) PCT No.: PCT/JP2012/065984
§ 371 (c)(1),
(2), (4) Date: Jan. 10, 2014

(87) PCT Pub. No.: WO2013/008608
PCT Pub. Date: Jan. 17, 2013

(65) Prior Publication Data
US 2014/0150207 A1    Jun. 5, 2014

(30) Foreign Application Priority Data

Jul. 11, 2011 (JP) .................................. 2011-153118
Jul. 11, 2011 (JP) .................................. 2011-153121
Jul. 11, 2011 (JP) .................................. 2011-153126
Jul. 11, 2011 (JP) .................................. 2011-153129

(51) Int. Cl.
*E05C 3/06* (2006.01)
*E05F 5/02* (2006.01)
(Continued)

(52) U.S. Cl.
CPC .............. *E05F 5/025* (2013.01); *E05F 5/022* (2013.01); *E05F 5/10* (2013.01); *E05F 7/04* (2013.01); *F16F 9/20* (2013.01); *F16F 9/38* (2013.01); *E05Y 2900/536* (2013.01); *Y10T 16/61* (2015.01)

(58) Field of Classification Search
CPC . Y10T 16/2766; Y10T 16/281; Y10T 16/62; Y10T 16/276; Y10T 16/2777; E05B 77/42; E05B 17/0041; E05B 2047/0033; E05B 51/02; E05B 81/10; E05B 81/52; Y10S 16/09; E05Y 2201/256; F16F 9/20
USPC ......................................................... 292/201
See application file for complete search history.

(56) References Cited

U.S. PATENT DOCUMENTS 5,456,283 A * 10/1995 Schap .................. E05C 17/305
                                                              137/514.5
5,685,578 A * 11/1997 Schneider ........... E05B 17/2038
                                                              292/144

(Continued)

FOREIGN PATENT DOCUMENTS

CN          1940336 A        4/2007
CN        101858179 A       10/2010

(Continued)

OTHER PUBLICATIONS

Chinese Office Action dated Aug. 25, 2015 with an English translation thereof.

(Continued)

*Primary Examiner* — Mark Williams
(74) *Attorney, Agent, or Firm* — McGinn IP Law Group, PLLC

(57) ABSTRACT

A damper apparatus includes a piston having a flange-shaped piston main body and piston rods which project from both ends of the piston main body, a cylinder having a cylinder main body which accommodates the piston main body slidably and cylindrical portions which support slidably the piston rods, respectively, a fastener which is attached to the one cylindrical portion so as to secure the cylinder to an opening/closing member, and a coil spring which biases the one piston rod to project from the other cylindrical portion such that a distal end portion of the piston rod abuts a circumferential edge of an opening portion of a vehicle.

27 Claims, 15 Drawing Sheets

(51) Int. Cl.
*E05F 5/10* (2006.01)
*E05F 7/04* (2006.01)
*F16F 9/38* (2006.01)
*F16F 9/20* (2006.01)

(56) References Cited

U.S. PATENT DOCUMENTS

| | | | | |
|---|---|---|---|---|
| 5,836,050 A | * | 11/1998 | Rumez | E05C 17/30 16/82 |
| 6,318,521 B1 | * | 11/2001 | Niaura | F16F 9/532 188/267.1 |
| 7,216,402 B2 | * | 5/2007 | Nishiyama | E05B 85/12 16/412 |
| 2002/0148075 A1 | | 10/2002 | Monig | |

FOREIGN PATENT DOCUMENTS

| JP | 61-182434 U | 11/1986 |
|---|---|---|
| JP | 62-106140 A | 5/1987 |
| JP | 63-9447 Y2 | 3/1988 |
| JP | 3-139427 A | 6/1991 |
| JP | 4-11942 U | 1/1992 |
| JP | H 08-326819 A | 12/1996 |
| JP | 10-184609 A | 7/1998 |
| JP | H 11-022772 A | 1/1999 |
| JP | 2007-205062 A | 8/2007 |
| JP | 2007-263349 A | 10/2007 |
| JP | 2009-168233 A | 7/2009 |

OTHER PUBLICATIONS

International Search Report (ISR) (PCT Form PCT/ISA/210) dated Sep. 25, 2012, in PCT/JP2012/065984.
Japanese Office Action in counterpart foreign Application No. 2011-153121 dated Jun. 2, 2015 with a partial English translation thereof.
Japanese Office Action in counterpart foreign Application No. 2011-153126 dated Jun. 2, 2015 with a partial English translation thereof.
Extended European Search Report dated Jun. 30, 2016.

* cited by examiner

VEHICLE OPENING/CLOSING MEMBER DAMPER APPARATUS AND VEHICLE OPENING/CLOSING MEMBER STOPPER APPARATUS

TECHNICAL FIELD

The present invention relates to a vehicle opening/closing member damper apparatus for preventing vibrations generated when an opening/closing member such as a vehicle door, for example, is closed and a vehicle opening/closing member stopper apparatus for restricting the rotation of the opening/closing member when the opening/closing member is closed.

BACKGROUND ART

A back door is attached to a vehicle such as a hatchback, a station wagon or a van for openably closing a luggage compartment at the rear of the vehicle. When a circumferential edge portion of the back door abuts a circumferential edge of an opening portion in the luggage compartment, the opening portion is closed. When the vehicle is driving or idling, the sympathetic vibration of the opening/closing member may be caused to generate uncomfortable noise or uncomfortable feeling. Various constructions have been proposed to suppress such uncomfortable noise. For example, there is proposed a construction which includes a cylinder whose interior is filled with a viscous fluid such as oil and a piston which is disposed slidably within the cylinder so as to damp vibration by restricting the sliding motion of the piston by the resistance of the viscous fluid.

Patent Literature 1 describes a vehicle opening/closing member stopper which positions a vehicle opening/closing member relative to a vehicle body and includes a damping member for damping vibration in an opening/closing direction of the vehicle opening/closing member upon its closure.

An embodiment shown in FIG. 8 in Patent Literature 1 includes a stopper main body secured to a tailgate panel and a hydraulic damper attached to a vehicle body panel. The hydraulic damper has a housing in which a fluid is sealed, a circular flange-shaped piston which is disposed slidably within the housing and in which an orifice is provided, a rod which projects from one surface of the piston, a seat which is provided at a distal end of the rod to contact and separate from the stopper main body, and a pair of springs which movably support the piston. The hydraulic damper is installed in a restriction member of hard rubber, and the restriction member is secured to the vehicle body panel by a securing member, whereby the hydraulic damper is attached to the vehicle body panel.

Then, when the tailgate or the vehicle body vibrates, the piston slides within the cylinder, and the vibration is damped by flowing resistance generated as the fluid passes through the orifice.

Patent Literature 2 describes a fluid sealed torque stopper which is disposed between an engine and a vehicle body so as to suppress the vibration of the engine. The torque stopper is made up of a pair half members which are joined together via a bulkhead and includes a cylinder having a fluid chamber and an air chamber, a piston rod which is inserted into the cylinder and which extends to an exterior of the cylinder at one end portion thereof, and a piston which is secured to the piston rod and disposed in the fluid chamber and which has an orifice. An end of the cylinder is coupled to the vehicle body side via a coupling portion, and the end portion of the piston rod which extends to the exterior of the cylinder is coupled to the engine side via a coupling portion. When the engine vibrates, the piston disposed in the fluid chamber of the cylinder slides, and the vibration of the engine is damped by resistance generated as the fluid passes through the orifice in the piston.

Patent Literature 3 describes a front fork having a vehicle-body-side tube, a wheel-side tube and a piston member. The vehicle-body-side tube is closed at an upper end and is opened at the other end. The wheel-side tube has a cylindrical shape, is disposed in the vehicle-body-side tube so as to rise and lower therein, and is opened at both upper and lower ends thereof. The piston member is disposed in the wheel-side tube so as to rise and lower therein.

A lower bearing member is coupled to an inside lower portion of the wheel-side tube, and an upper bearing member is coupled to an opening portion at the upper end of the wheel-side tube. An upper rod member which project from an upper surface of the piston member is supported by the upper bearing member, and a lower rod which projects from a lower surface of the piston member is supported by the lower bearing member. The upper rod is coupled to an upper wall of the vehicle-body-side tube at a distal end portion thereof, whereby the vehicle-body-side tube and the piston member are integrated with each other.

A spring is interposed between the upper wall and the upper bearing member inside the vehicle-body-side tube, so that the wheel-side tube is biased downwards relative to the vehicle-body-side tube. In addition, springs are interposed respectively between the upper bearing member and the piston member and between the piston member and the lower bearing member inside the wheel-side tube, so that the piston member is held in a predetermined position on an inner circumference of the wheel-side tube.

Then, when the wheel-side tube and the vehicle-body-side tube rise or lower relative to each other due to the vibration of the vehicle body side or the wheel side, the piston member rises or lowers within the wheel-side tube against the biasing force of the springs, and the piston member is slowed by oil which fills the wheel-side tube to thereby damp the vibrations.

An opening/closing member such as a trunk lid, a back door or the like is attached to a trunk or a rear luggage compartment of a vehicle so as to be opened and closed. The opening/closing member abuts a circumferential edge of an opening portion of the trunk or the luggage compartment so as to close the opening portion. In order to prevent the application of an excessive impact force or generation of striking noise due to striking of the trunk lid or the back door against the circumferential edge of the opening portion, a stopper may be disposed between the opening portion and the opening/closing member, so that the opening/closing member indirectly abuts the circumferential edge of the opening portion via this stopper, thereby restricting the rotational movement of the opening/closing member.

As such stopper, Patent Literature 4 describes an elastic structure which includes a base which is fixed to a trunk lid panel and an expandable/contractable cap member which is mounted thereon. The base has an insertion portion having a pair of locking claws and a holding portion which is provided continuously to the insertion portion. A pair of locking shoulder pieces are provided on a circumferential edge at an upper end of the holding portion, and an annular projection projects halfway along an axial direction of the holding portion. A movable shaft material is inserted into a center of the insertion portion and the holding portion so as to move vertically. A coil spring is interposed between a lower collar portion at a lower end of the movable shaft material and a step portion at a lower end of the holding portion, so that a lower end portion of the movable shaft material is biased so as to always project.

The cap member has a bottomed cylindrical shape, and is formed of a rubber material. An annular depressed groove is formed on an inner side of an upper end portion of the cap member, and an expandable/contractable accordion portion is formed halfway along an axial direction of the cap member. A semi-spherical elastic abutment portion is provided at a lower end portion of the cap member. Then, the upper end portion of the cap member is expanded so that the annular depressed groove of the cap member is securely fitted on the annular projection on an outer circumference of the holding portion, whereby the annular projection and the annular depressed groove are secured to each other elastically and tightly, and the cap member is mounted on the base with a gap between the base and the cap member sealed up closely. The locking claws of the insertion portion which is inserted into an attachment hole in the trunk lid panel engage with a rear side of the attachment hole, and the locking shoulder pieces of the holding portion engage with a front side of the attachment hole, whereby the elastic structure is attached to the trunk lid panel.

PRIOR ART LITERATURE

Patent Literature

Patent Literature 1: JP-UM-S61-182434-A
Patent Literature 2: JP-S62-106140-A
Patent Literature 3: JP-2009-168233-A
Patent Literature 4: JP-UM-H04-11942-A

SUMMARY OF THE INVENTION

Problem that the Invention is to Solve

In the stopper of Patent Literature 1, although the piston is supported movably by the pair of springs, the rod projecting from the one surface of the piston is supported slidably on the housing. Therefore, the piston may be inclined while it is sliding, and the smooth sliding of the piston may be prevented.

In addition, the hydraulic damper of the stopper is installed in the restriction member formed of the hard rubber, and this restriction member is secured to the vehicle body panel by the securing member (which is considered to an adhesive, a bolt or the like). Thus, although the stopper can eventually be attached to the vehicle body panel, the efficiency of the attaching work may not be good.

Consequently, a first object of the invention is to provide a vehicle opening/closing member damper apparatus which enables a piston main body to slide smoothly by preventing the inclination of the piston main body and which can improve the efficiency of attaching work of attaching the apparatus to a circumferential edge of an opening portion or an opening/closing member.

In the torque stopper of Patent Literature 2, the distance between the lid which closes the opening portion of the cylinder at the other end side thereof (the side from which the piston rod extends outwards) and the coupling portion on the engine side is longer than the distance between the piston and the bulkhead inside the cylinder. Therefore, the movement of the piston is restricted by the abutment of the coupling portion on the engine side with an opening/closing member of the cylinder. Because of this, the opening/closing member of the cylinder may be deformed or damaged by an excessive load or load applied repeatedly.

Consequently, a second object of the invention is to provide a vehicle opening/closing member damper apparatus which can suppress the vibration of an opening/closing member effectively and which can prevent the deformation or damage to a cylinder.

The upper rod and the lower rod which project from the piston member of Patent Literature 3 are supported by the upper bearing member which is coupled to the opening portion at the upper end of the wheel-side tube and the lower bearing member which is coupled to the inside lower portion of the wheel-side tube, respectively. However, these upper bearing member and lower bearing member are formed separately from the wheel-side tube and are coupled to the opening portion at the upper end and the inside lower portion of the wheel-side tube. Thus, the number of components is increased and the construction becomes complex.

In Patent Literature 3, the plural springs are disposed inside the vehicle-body-side tube or the wheel-side tube. Therefore, an outside diameter of the springs may become insufficient depending on an inside diameter of each tube, and the spring force may also become insufficient. Additionally, since the plural springs are disposed in series inside both the tubes, the lengths of both the tubes tend to be increased, and the front fork may become large in size.

Consequently, a third object of the invention is to provide a vehicle opening/closing member damper apparatus in which a pair of piston rods can be supported with a simple construction and which can shorten the overall length of the cylinder while ensuring a sufficient outside diameter for a coil spring.

In Patent Literature 4, the annular depressed groove of the cap member is secured to the annular projection of the base elastically and closely so that the gap between the base and the cap member is sealed up closely, thereby preventing the ingress of water such as rain water or the like into the cap member. On the other hand, when the movable shaft material contracts against the biasing force of the spring and the accordion portion of the cap member contracts upon abutment of the elastic abutment portion of the cap member and the counterpart member, air is trapped within the cap member, and it can not escape to the outside thereof. Since the air within the cap member acts like a pneumatic spring, when the trunk lid is closed towards the opening portion in the trunk, there is caused a resistance against its closure.

Consequently, a fourth object of the invention is to provide a vehicle opening/closing member stopper apparatus which can prevent the ingress of water into an interior of a cover member and which can discharge air in the interior of the cover member to an exterior thereof.

Means for Solving the Problem

With a view to achieving the first object, Invention 1 provides
a vehicle opening/closing member damper apparatus which is disposed between an opening portion provided in a vehicle and an opening/closing member attached to the opening portion for preventing a vibration of the opening/closing member upon its closure, including:
a piston having a flange-shaped piston main body and a pair of piston rods which project respectively from both end faces of the piston main body;
a cylinder having a cylinder main body which accommodates the piston main body slidably and cylindrical portions which support respectively the pair of piston rods slidably, an interior of the cylinder being filled with a viscous fluid;

a fastener which is attached to one of the cylindrical portions to secure the cylinder to one of a circumferential edge of the opening portion and the opening/closing member; and an elastic member which biases the piston so that one of the piston rods projects from the other of the cylindrical portions and a distal end portion of the piston rod abuts the other of the circumferential edge of the opening portion and the opening/closing member.

Invention 2 provides the vehicle opening/closing member damper apparatus of Invention 1, wherein the fastener has an accommodating cylindrical portion which accommodates and fixes the one of the cylindrical portions and which is inserted into an attachment hole provided in the circumferential edge of the opening portion or the opening/closing member and a fixing member which is provided on an outer circumference of the accommodating cylindrical portion and which engages with the attachment hole.

Invention 3 provides the vehicle opening/closing member damper apparatus of Invention 2, wherein an air releasing hole is formed in a bottom portion of the one of the cylindrical portions which is accommodated in the accommodating cylindrical portion of the fastener.

Invention 4 provides the vehicle opening/closing member damper apparatus of Invention 2 or 3, wherein plural elongated projections project from an inner circumference of the accommodating cylindrical portion of the fastener so as to extend in an axial direction at plural portions in a circumferential direction, wherein plural engagement claws are provided on an outer circumference of the accommodating cylindrical portion via slits at portions situated between the plural elongated projections, so as to be engaged with a circumferential edge on a rear side of the attachment hole, and wherein the engagement claws make up the fixing member.

Invention 5 provides the vehicle opening/closing member damper apparatus of any of Inventions 1 to 4, wherein the fastener has a flange portion which is engaged with a circumferential edge on a front side of the attachment hole provided in the circumferential edge of the opening portion or the opening/closing member and an insertion portion which is inserted into the attachment hole and engaged with a circumferential edge on a rear side of the attachment hole, and wherein there is provided an expandable/contractable cover which covers a portion of the cylinder projecting from the front side of the attachment hole and which is joined to the flange portion of the fastener, so that air inside the cover member is allowed to communicate from the insertion portion to an exterior of the fastener on the rear side of the attachment hole through a gap between the cylinder and the fastener when the cover member is expanded or contracted.

Invention 6 provides the vehicle opening/closing member damper apparatus of Invention 5, wherein, when the one of the cylindrical portions is fixed to the fastener, a gap is defined between the flange portion and a portion of the cylinder facing the flange portion, and an air releasing groove is provided between an inner circumference of the cover member and the cylinder, so that air inside the cover member is allowed to communicate with the exterior through the air releasing groove and the gap.

Invention 7 provides the vehicle opening/closing member damper apparatus of Invention 4, wherein through holes are formed respectively in a bottom portion of the accommodating cylindrical portion and the bottom portion of the one of the cylindrical portions, and a fixing device is inserted into the through holes to thereby couple the fastener and the cylinder, wherein a projecting portion is formed on the bottom portion of the accommodating cylindrical portion of the fastener so as to abut the bottom portion of the one of the cylindrical portions, and wherein a gap is defined between the bottom portion of the one of the cylindrical portions and the bottom portion of the accommodating cylindrical portion of the fastener.

With a view to achieving the second object, Invention 8 provides a vehicle opening/closing member damper apparatus which is disposed between an opening portion provided in a vehicle and an opening/closing member attached to the opening portion for preventing a vibration of the opening/closing member upon its closure, including:

a piston having a flange-shaped piston main body and a piston rod which projects from at least one end face of the piston main body;

a cylinder having a first body having a first cylindrical portion which accommodates the piston main body slidably and a second cylindrical portion which extends continuously from one end portion of the first cylindrical portion while being reduced in diameter and which accommodates the piston rod being inserted therethrough and a second body which is connected to the other end portion of the first cylindrical portion of the first body and which is secured to one of the circumferential edge of the opening portion and the opening/closing member, an interior of the cylinder being filled with a viscous fluid; and an elastic member which biases the piston so that the piston rod projects from the second cylindrical portion of the first body and a distal end portion of the piston rod abuts the other of the circumferential edge of the opening portion and the opening/closing member, wherein, when the piston moves towards the second body against the elastic member, the piston main body directly or indirectly abuts the second body so as to restrict a further movement of the piston.

Invention 9 provides the vehicle opening/closing member damper apparatus of Invention 8, wherein the first body has a first flange portion extends from a circumferential edge of the other end portion of the first cylindrical portion which is opposite to the one end portion corresponding to second cylindrical portion, wherein the second body has a second flange portion which extends from a circumferential edge thereof and which is joined to the first flange portion, and wherein, when the piston moves towards the second body against the elastic member, the piston main body directly or indirectly abuts the second flange portion.

Invention 10 provides the vehicle opening/closing member damper apparatus of Invention 9, wherein a diameter of one of the first flange portion and the second flange portion is larger than that of the other of the first flange portion and the second flange portion, wherein an annular gasket is disposed between the first flange portion and the second flange portion, wherein the first body and the second body are coupled together by crimping a circumferential edge of the one of the first flange portion and the second flange portion having the larger diameter, and wherein the gasket extends so that an inner circumference thereof abuts an outer circumference of the piston.

Invention 11 provides the vehicle opening/closing member damper apparatus of Invention 9 or 10, wherein the second flange portion of the second body directly or indirectly abuts a circumferential edge of an attachment hole provided in the circumferential edge of the opening portion or the opening/closing member.

Invention 12 provides the vehicle opening/closing member damper apparatus of any of Inventions 9 to 11, wherein a washer plate is attached to an end portion of the piston rod projecting from the second cylindrical portion of the first body so as to abut the other of the circumferential edge of the opening portion and the opening/closing member, and wherein the elastic member is a coil spring one end of which is supported by the washer plate and the other end of which is supported by the first flange portion of the first body.

Invention 13 provides the vehicle opening/closing member damper apparatus of Invention 12, wherein the washer plate does not abut the second cylindrical portion of the first body even when the piston main body abuts the second body via the gasket.

Invention 14 provides the vehicle opening/closing member damper apparatus of any of Inventions 8 to 13, wherein another piston rod projects from the other end face of the piston main body, and wherein the second body has a third cylindrical portion which supports the another piston rod slidably.

Invention 15 provides the vehicle opening/closing member damper apparatus of Invention 14, further including:

a fastener which is attached to the second body of the cylinder so as to secure the cylinder to the circumferential edge of the opening portion or the opening/closing member, and wherein the third cylindrical portion extends longer than the another piston rod to define a space portion into which the another piston rod is not inserted at a distal end portion thereof, and wherein the fastener is secured to an end face of the third cylindrical portion via a fixing device.

Invention 16 provides the vehicle opening/closing member damper apparatus of Invention 15, wherein a gap is defined between the another piston rod projecting from the other end face of the piston main body and the fixing device even when the piston main body directly or indirectly abuts the second body.

Invention 17 provides the vehicle opening/closing member damper apparatus of any of Inventions 8 to 16, wherein the first body has a connection wall which connects the first cylindrical portion and the second cylindrical portion and which is inclined so as to project further in an axial direction as the connection wall extends towards the second cylindrical portion.

Invention 18 provides the vehicle opening/closing member damper apparatus of any of Inventions 8 to 16, wherein the first body has a connection wall which connects the first cylindrical portion and the second cylindrical portion and which is inclined so as to be depressed further in an axial direction as the connection wall extends towards the second cylindrical portion.

Invention 19 provides the vehicle opening/closing member damper apparatus of any of Inventions 8 to 18, further including:

a fastener which is attached to the second body of the cylinder so as to secure the cylinder to the circumferential edge of the opening portion or the opening/closing member, and wherein the fastener has an engagement claw which engages with a circumferential edge on a rear side of an attachment hole provided in the circumferential edge of the opening portion or the opening/closing member and a flange portion which engages with the circumferential edge on a front side of the attachment hole, and wherein a portion of the second body abutted by the piston main body abuts the flange portion of the fastener.

With a view to achieving the third object, Invention 20 provides a vehicle opening/closing member damper apparatus which is disposed between an opening portion provided in a vehicle and an opening/closing member attached to the opening portion for preventing a vibration of the opening/closing member upon its closure, including:

a piston having a flange-shaped piston main body and a pair of piston rods which project respectively from both end faces of the piston main body;

a cylinder having a first body having a first cylindrical portion which accommodates the piston main body slidably, a second cylindrical portion which extends continuously from one end portion of the first cylindrical portion while being reduced in diameter and which supports one of the piston rods being inserted therethrough and a first flange portion which extends from a circumferential edge of the other end portion of the first cylindrical portion and a second body having a third cylindrical portion which supports the other of the piston rods being inserted therethrough and a second flange portion which extends from a circumferential edge of one end portion of the third cylindrical portion to be joined to the first flange portion and which is secured to one of the circumferential edge of the opening portion and the opening/closing member, an interior of the cylinder being filled with a viscous fluid; and a coil spring which biases the piston so that the one of the piston rods projects from the second cylindrical portion of the first body and a distal end portion of the piston rod abuts the other of the circumferential edge of the opening portion and the opening/closing member, wherein the coil spring is disposed on an outer circumference of the cylinder such that one end of the coil spring is supported by abutting a joint portion of the first flange portion and the second flange portion while the other end of the coil spring is supported on a distal end portion side of the piston rod projecting from the second cylindrical portion.

Invention 21 provides the vehicle opening/closing member damper apparatus of Invention 20, wherein the first flange portion and the second flange portion of the cylinder are crimped to be joined together.

Invention 22 provides the vehicle opening/closing member damper apparatus of Invention 21, wherein a diameter of the first flange portion is larger than that of the second flange portion, and wherein the first flange portion and the second flange portion are joined together by crimping a circumferential edge portion of the first flange portion.

Invention 23 provides the vehicle opening/closing member damper apparatus of any of Inventions 20 to 22, wherein the first body has a connection wall which connects the first cylindrical portion and the second cylindrical portion, and the connection wall has an inclined shape.

With a view to achieving the fourth object, Invention 24 provides a vehicle opening/closing member stopper apparatus which is disposed between an opening portion provided in a vehicle and an opening/closing member attached to the opening portion for restricting a rotation of the opening/closing member, including:

an expandable/contractable stopper main body; and a fastener which secures a proximal end portion of the stopper main body to one of a circumferential edge of the opening portion and the opening/closing member such that a distal end portion of the stopper main body is directed towards the other of the circumferential edge of the opening portion and the opening/closing member, wherein a flange portion which engages with a circumferential edge on a front side of an attachment hole which is provided in the circumferential edge of the opening portion or the opening/closing member and an insertion portion which is inserted into the attachment hole so as to be engaged with a circumferential edge on a rear side of the attachment hole are provided on the fastener, and wherein there is provided an expandable/contractable cover member which covers a portion of the stopper main body projecting from the front side of the attachment hole and which is joined to the flange portion of the fastener, so that air inside the cover member is allowed to communicate from the insertion portion to an exterior of the fastener on the rear side of the attachment hole through a gap between the stopper main body and the fastener when the cover member is expanded or contracted.

Invention 25 provides the vehicle opening/closing member stopper apparatus of Invention 24, wherein a seal member is disposed on a rear surface side of the flange portion, and wherein an end edge portion of the cover member is joined while being held between the flange portion and the seal member.

Invention 26 provides the vehicle opening/closing member stopper apparatus of Invention 25, wherein the seal member is made of a foamed material and is made larger than an outside diameter of a joint portion where the cover member is joined to the flange portion.

Invention 27 provides the vehicle opening/closing member stopper apparatus of any of Inventions 24 to 26, wherein the insertion portion has a cylindrical portion which accommodates the proximal end portion of the stopper main body and which is inserted into the attachment hole, wherein the flange portion is formed at an opening portion of one end of the cylindrical portion, wherein an engagement claw is provided on a side wall of the cylindrical portion via a slit, so as to be engaged with the circumferential edge on the rear side of the attachment hole, and wherein a gap is defined between the stopper main body and the cylindrical portion.

Invention 28 provides the vehicle opening/closing member stopper apparatus of Invention 27, wherein the proximal end portion of the stopper main body is fixed to a bottom surface of the cylindrical portion of the fastener by a fixing device.

Advantage of the Invention

According to the inventions for achieving the first object, when the opening/closing member is closed to the opening portion, the piston rod which project from the second cylindrical portion of the cylinder abuts the circumferential edge of the opening portion or the opening/closing member, whereby the cylinder rod is pushed in towards the cylinder against the coil spring. As a result, the opening/closing member is always biased in the direction in which the opening portion provided in the vehicle is opened, thereby preventing the looseness of the opening/closing member in a locked state.

When the opening/closing member is about to vibrate due to vibration generated while the vehicle is being driven, a vibration damping effect is caused by the flowing resistance of the viscous fluid generated as the piston main body moves within the cylinder to thereby prevent the sympathetic vibration of the opening/closing member, whereby the generation of uncomfortable noise in the passenger compartment can be prevented. Since the pair of piston rods are supported slidably by the cylindrical portions, the piston main body is prevented from being inclined, thereby allowing the piston main body to slide in a stable posture.

The fastener is attached to one of the cylindrical portions, and the damper apparatus can be attached to the circumferential edge of the opening portion or the opening/closing member via the fastener. Therefore, the efficiency of the attaching work can be enhanced.

According to the inventions for achieving the second object, when the opening/closing member is closed to the opening portion, the piston rod projecting from the cylinder abuts the circumferential edge of the opening portion or the opening/closing member, whereby the piston rod is pushed in towards the cylinder against the elastic member. As a result, the opening/closing member is always biased in the direction in which the opening portion provided in the vehicle is opened, thereby preventing the looseness of the opening/closing member in a locked state.

When the opening/closing member is about to vibrate due to fine vibration generated when the vehicle is being driven, a vibration damping effect is caused by the flowing resistance of the viscous fluid generated as the piston main body moves within the cylinder to thereby prevent the sympathetic vibration, whereby the generation of uncomfortable noise in the passenger compartment can be prevented.

When the opening/closing member is closed to the opening portion, the piston rod projecting from the cylinder abuts the circumferential edge of the opening portion or the opening/closing member, whereby the piston rod is pushed in against the elastic member, and the flange-shaped piston main body directly or indirectly abuts the second body to thereby restrict the movement of the piston. Therefore, no large load is applied to the first body, and hence the deformation of the first body can be prevented. As a result, the piston main body is allowed to operate in an ensured fashion.

According to the inventions for achieving the third object, when the opening/closing member is closed to the opening portion, the piston rod projecting from the second cylindrical portion of the cylinder abuts the circumferential edge of the opening portion or the opening/closing member, whereby the piston rod is pushed in towards the cylinder. As a result, the opening/closing member is always biased in the direction in which the opening portion provided in the vehicle is opened, thereby preventing the looseness of the opening/closing member in a locked state.

When the opening/closing member is about to vibrate due to vibration generated when the vehicle is being driven, a vibration damping effect is caused by the flowing resistance of the viscous fluid generated as the piston main body moves within the cylinder to thereby prevent the sympathetic vibration, whereby the generation of uncomfortable noise in the passenger compartment can be prevented.

Then, the coil spring is disposed on the outer circumference of the cylinder such that the one end thereof abuts the joint portion of the first flange portion and the second flange portion for support, while the other end thereof is supported at the distal end portion side of the piston rod. Therefore, compared with the construction described in Patent Literature 1 in which the spring is disposed inside the tube, the outside diameter of the coil spring can be ensured to a sufficient extent to obtain a high spring force. As a result, the overall length of the cylinder can be shortened, thereby saving the installation space for the cylinder.

The cylinder which can accommodate the piston main body slidably while supporting the pair of piston rods can be made up only of the first body and the second body. Therefore, the necessity of the upper bearing member and the lower bearing member described in Patent Literature 1 above is obviated, and this can reduce the number of constituent elements involved, resulting in the simple construction.

According to the inventions for achieving the fourth object, when the opening/closing member is closed to the opening portion, the distal end portion of the stopper main body abuts the circumferential edge of the opening portion or the opening/closing member to thereby restrict the rotation of the opening/closing member. In addition, the stopper main body which projects from the attachment hole to the front side thereof is covered by the expandable/contractable cover member, and the cover member is joined to the flange portion of the fastener. Therefore, the contact of rain water with the stopper main body and ingress of rain water or the like into the cover member can be prevented.

Although the cover member also expands or contracts when the stopper main body expands or contracts, air in the interior of the cover member communicates from the insertion portion to the exterior of the fastener on the rear side of the attachment hole through the gap defined between the stopper main body and the fastener. Therefore, it is possible to prevent the air inside the cover member from being trapped therein to thereby constitute a pneumatic spring which provides resistance.

BRIEF DESCRIPTION OF THE DRAWINGS

FIG. 5A shows a plan view, and FIG. 5B shows a sectional view.

FIG. 6A shows a plan view, and FIG. 6B shows a sectional view taken along the line A-A in FIG. 6A.

FIG. 7A shows a sectional view, and FIG. 7B shows a sectional view taken along the line B-B in FIG. 7A.

FIG. 14A shows a plan view, and FIG. 14B shows a sectional view taken along the line C-C in FIG. 14A.

MODE FOR CARRYING OUT THE INVENTION

Figure 9:
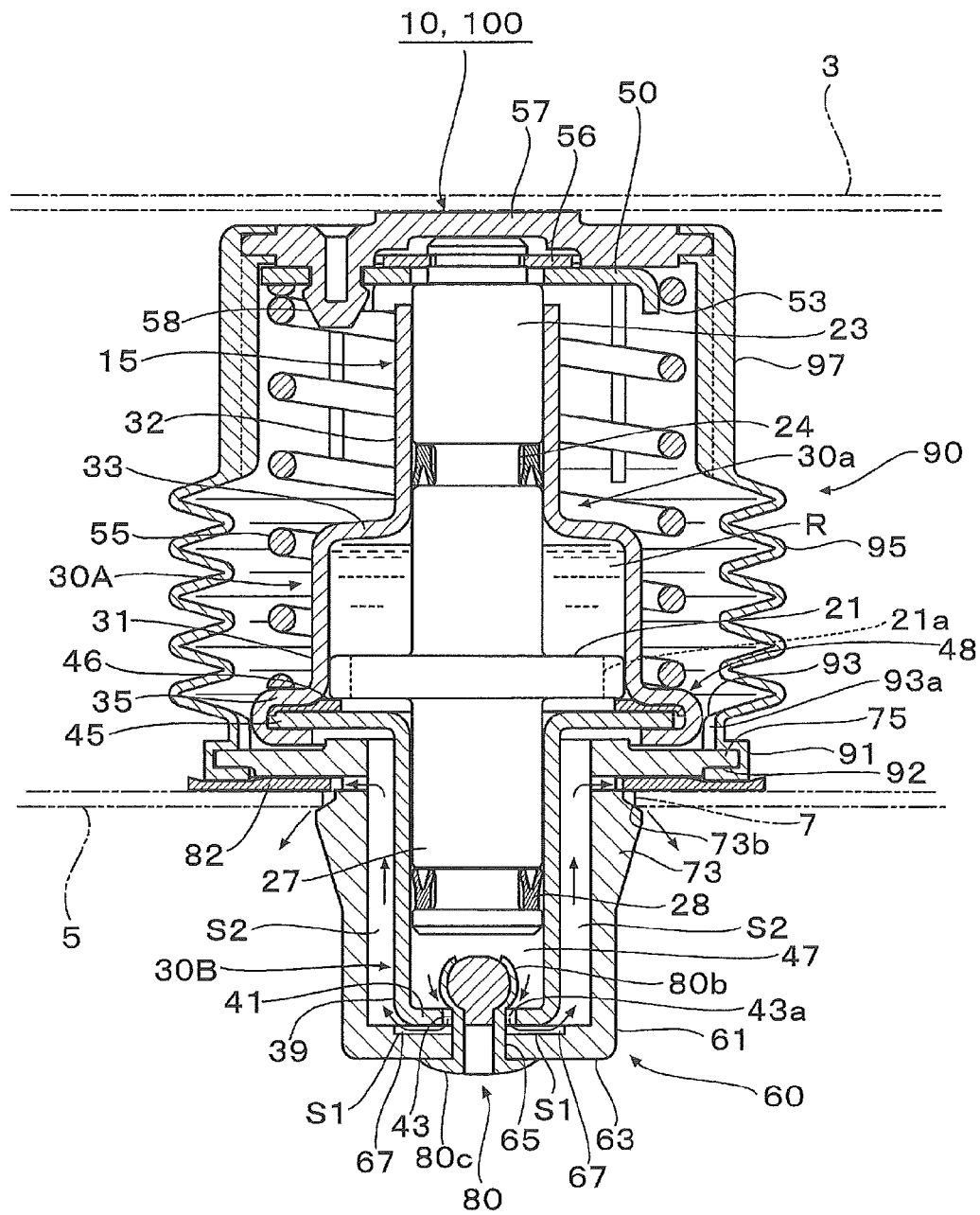
FIG. 9 is an explanatory diagram showing a state of the damper apparatus and the stopper apparatus during usage, in which a piston main body moves against a biasing force of the elastic member.
Figure 10:
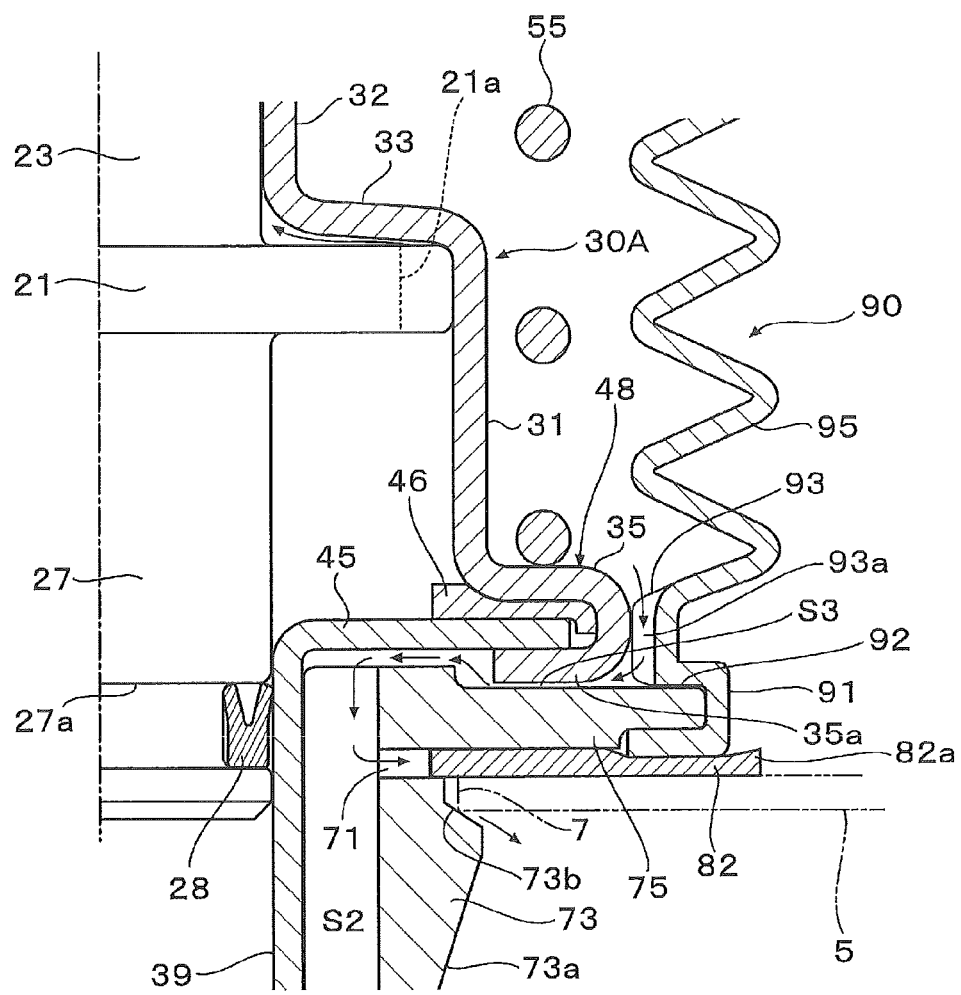
FIG. 10 is an enlarged explanatory view of the main part of the damper apparatus and the stopper apparatus.
Figure 11:
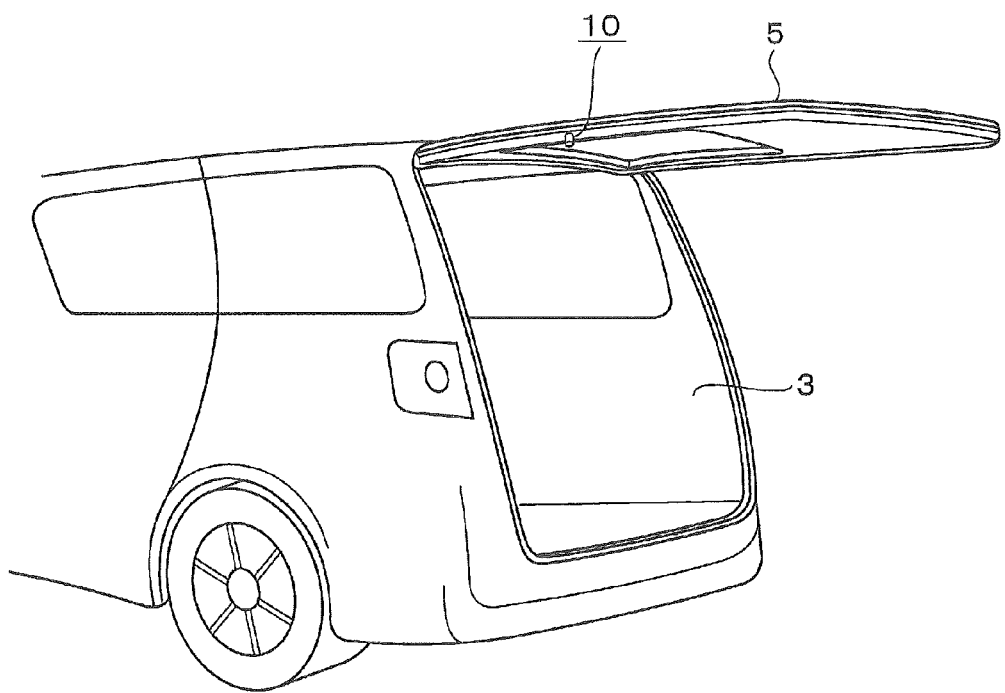
FIG. 11 is a perspective view showing an opening/closing member and an opening portion to which the damper apparatus and the stopper apparatus are applied.

Referring to FIGS. 1 to 11, one embodiment of a vehicle opening/closing member damper apparatus and a vehicle opening/closing member stopper apparatus according to the invention will be described. The vehicle opening/closing member damper apparatus is disposed between an opening portion 3 and an opening/closing member 5 for preventing the vibration upon closure of the opening/closing member 5 (see FIG. 11). The opening portion 3 is provided in a luggage compartment at the rear of a vehicle, and the opening/closing member 5 is a hatchback door attached to the opening portion 3. Also, as shown in FIG. 11, the vehicle opening/closing member stopper apparatus is disposed between the opening portion 3 and the opening/closing member 5 for restricting the rotation of the opening/closing member 5 upon its closure.

The vehicle opening/closing member damper apparatus and the vehicle opening/closing member stopper apparatus can be applied not only to the hatchback door at the rear of the vehicle but also to a hinged door or a sliding door at a side of the vehicle, and there is imposed no limitation on a location thereof.

Next, specific constructions of the vehicle opening/closing member damper apparatus 10 ("damper apparatus 10") and the vehicle opening/closing member stopper apparatus 100 ("stopper apparatus 100") according to this embodiment will be described. These apparatuses have basically the same constructions, and therefore the constructions thereof will be described altogether.

Figure 1:
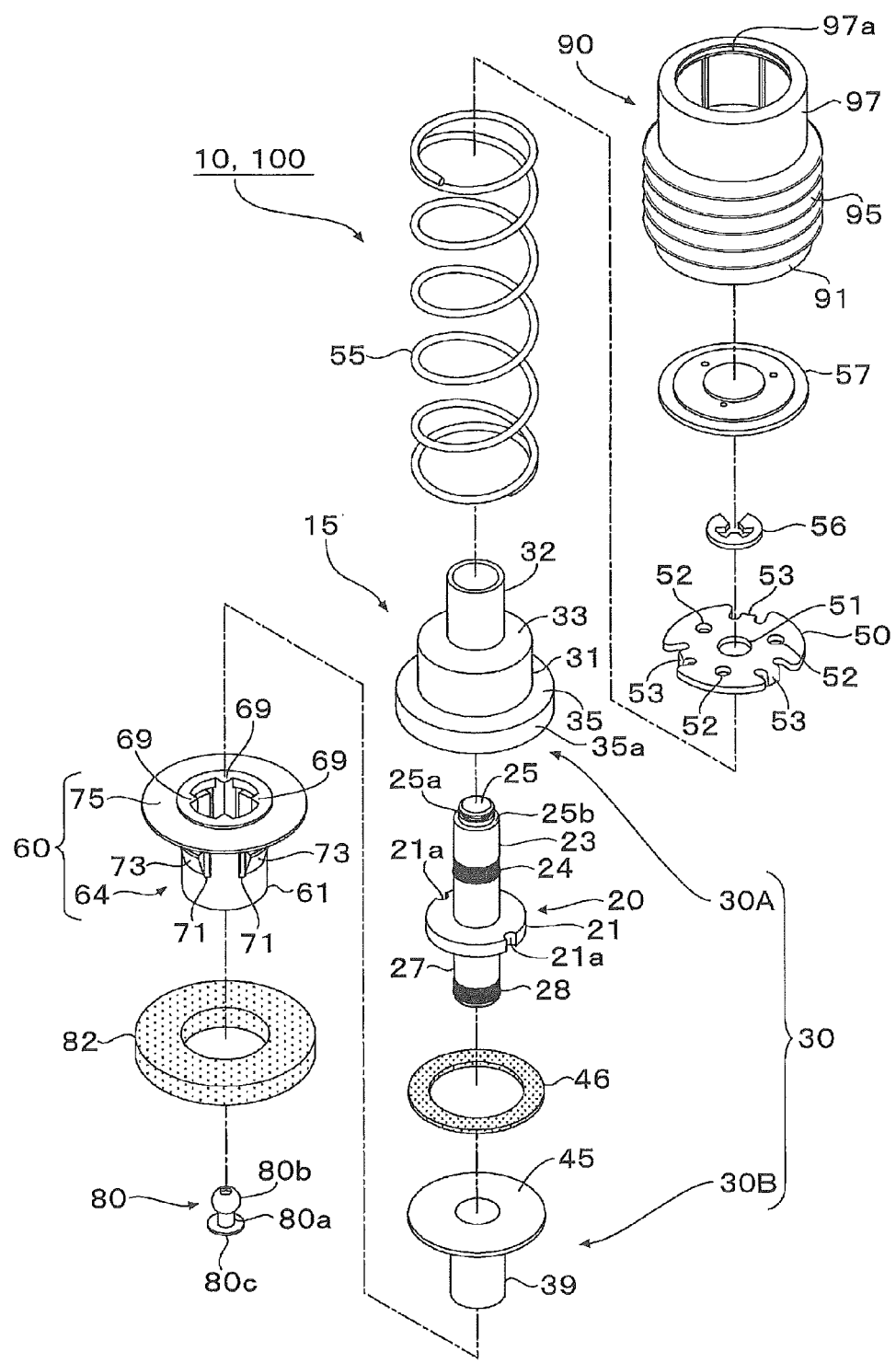
FIG. 1 is an exploded perspective view showing one embodiment of a vehicle opening/closing member damper apparatus and a vehicle opening/closing member stopper apparatus according to the invention.
Figure 3:
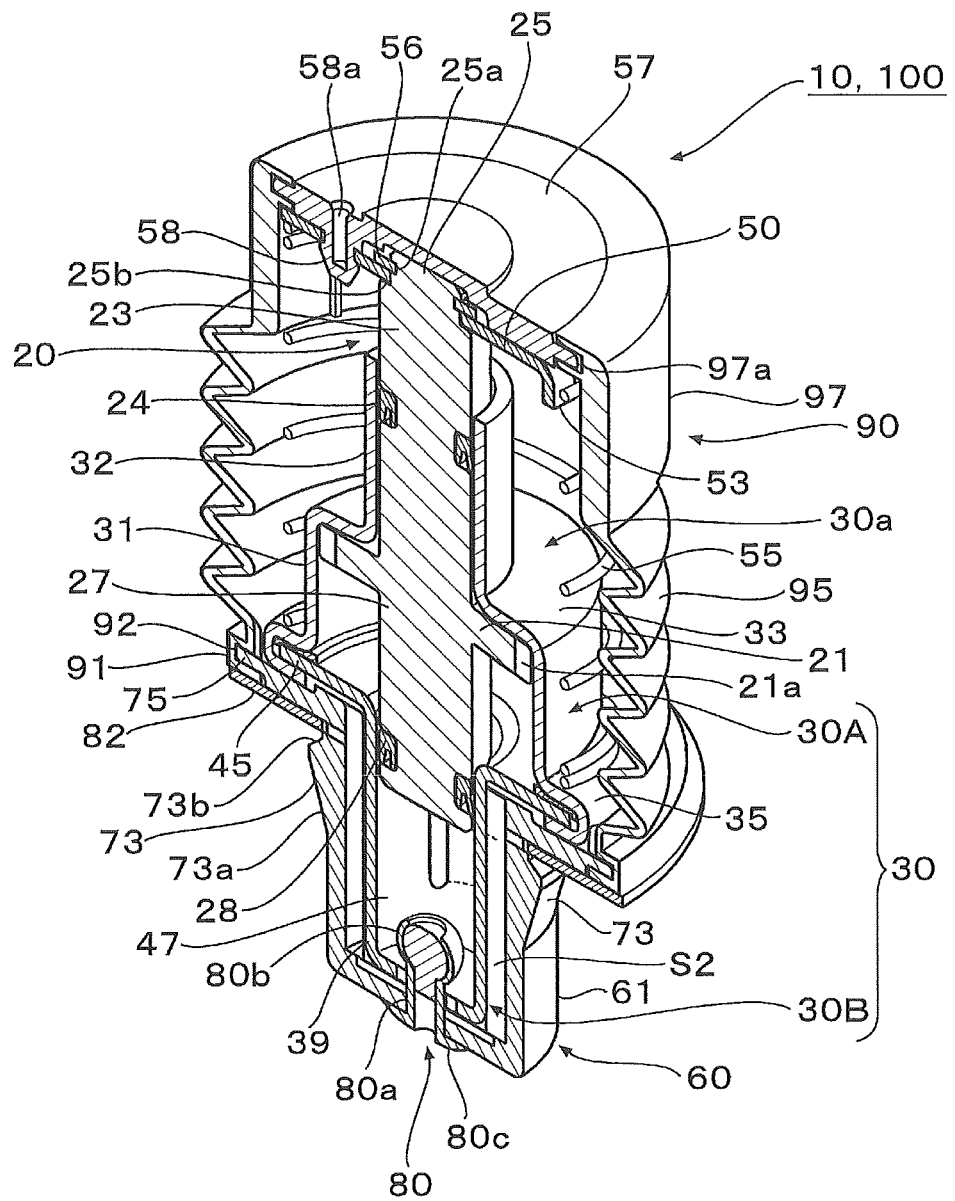
FIG. 3 is a sectional perspective view of the damper apparatus and the stopper apparatus.
Figure 8:
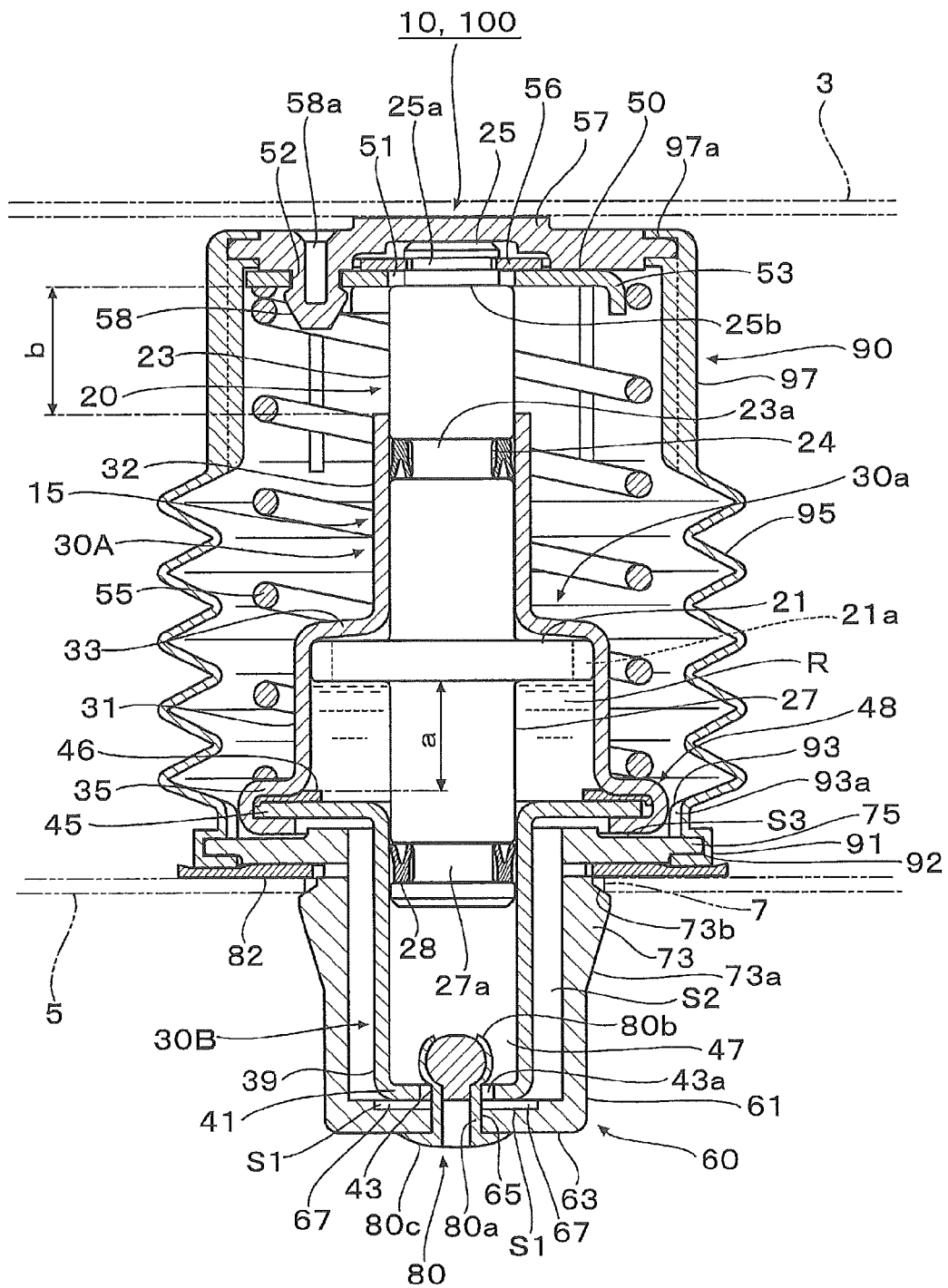
FIG. 8 is an explanatory diagram showing a state of the damper apparatus and the stopper apparatus during usage, in which a piston rod is biased by an elastic member.

A damper apparatus 10 according to the inventions for achieving the first object includes mainly a piston 20, a cylinder 30, a fastener 60, a coil spring 55 and a cover member 90, as shown in FIGS. 1, 3 and 8. The piston 20 has a flange-shaped piston main body 21 and a pair of piston rods 23, 27 which project respectively from both end faces of the piston main body 21. The cylinder 30 has a cylinder main body 30*a* which accommodates the piston main body 21 slidably (see FIG. 8) and cylindrical portions 32, 39 which support slidably the pair of piston rods 23, 27, respectively. The fastener 60 attaches the cylinder 30 to the opening/closing member 5. The coil spring 55 as an elastic member biases the one piston rod 23 towards the opening portion 3 of the vehicle. The cover member 90 covers the cylinder 30.

A damper apparatus 10 according to the inventions for achieving the second object includes mainly the piston 20, the cylinder 30, the fastener 60, a rivet 80, the coil spring 55 and the cover member 90, as shown in FIG. 1. From the piston 20, the pair of piston rods 23, 27 project. The cylinder 30 is made up of a first body 30A and a second body 30B which are coupled to each other via a gasket 46, and accommodates the piston 20 slidably. The fastener 60 attaches the cylinder 30 to the opening/closing member 5. The rivet 80 as a fixing device fixes the fastener 60 and the cylinder 30 together. The coil spring 55 as the elastic member biases the one piston rod 23 towards the opening portion 3 of the vehicle. The cover member 90 covers the cylinder 30.

A damper apparatus 10 according to the inventions for achieving the third object includes mainly the piston 20, the cylinder 30, the fastener 60, the rivet 80, the coil spring 55 and the cover member 90, as shown in FIG. 1. The piston 20 has the flange-shaped piston main body 21 and the pair of piston rods 23, 27 which project respectively from both the end faces of the piston main body 21. The cylinder 30 is made up of the first body 30A and the second body 30B which are coupled to each other, and accommodates the piston 20 slidably. The fastener 60 attaches the cylinder 30 to the opening/closing member 5. The rivet 80 fixes the fastener 60 and the cylinder 30 together. The coil spring 55 biases the one piston rod 23 towards the opening portion 3 of the vehicle. The cover member 90 covers the cylinder 30.

Figure 2:
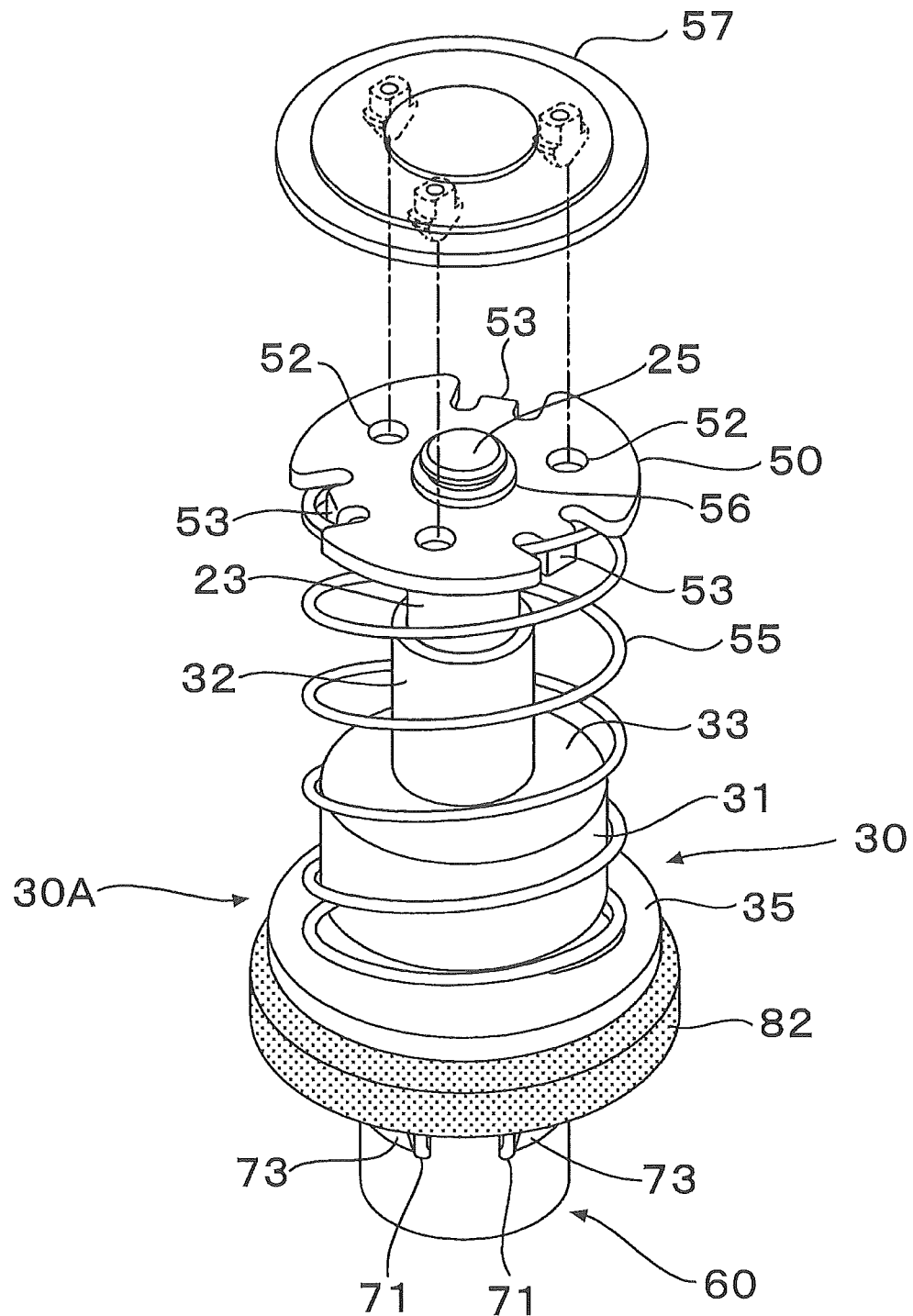
FIG. 2 is a perspective view showing the assembly of a main part of the damper apparatus and the stopper apparatus.

A stopper apparatus 100 according to the inventions for achieving the fourth object has a stopper main body 15, the fastener 60 and the cover member 90, as shown in FIGS. 1 and 2. The stopper main body 15 is expandable and contractable. The fastener 60 secures a proximal end portion of the stopper main boy 15 to the opening/closing member 5 such that a distal end portion of the stopper main body 15 is directed towards the opening portion 3 of the vehicle.

The cover member 90 is expandable and contractable, and covers a portion of the stopper main body 15 projecting from an attachment hole 7 (see FIG. 8) formed in the opening/closing member 5 to a front side thereof.

As shown in FIGS. 1 and 8, the stopper main body 15 of this embodiment includes the piston 20 and the cylinder 30. From the piston 20, the pair of piston rods 23, 27 project. The cylinder 30 is made up of the first body 30A and the second body 30B which are coupled to each other via the gasket 46, and accommodates the piston 20 slidably.

As shown in FIGS. 1, 3 and 8, the piston 20 has the piston main body 21 having a circular flange shape, the piston rod 23 which extends from a center of one end face of the piston main body 21 with a predetermined length, and the piston rod 27 which extends from a center of the other end face of the piston main body 21 coaxially with the piston rod 23 with a shorter distance than the piston rod 23. Notch-shaped orifices 21*a*, 21*a* are formed in an outer circumference of the piston main body 21 at opposite portions. Seal ring installation grooves 23*a*, 27*a* are formed halfway along an axial direction of the piston rods 23, 27, respectively, and seal rings 24, 28 are installed in the seal ring installation grooves 23*a*, 27*a*, respectively. A distal end portion 25 of the piston rod 23 is reduced in diameter so that a washer plate 50 is mounted thereon, and an E ring installation groove 25*a* is formed in an outer circumference thereof. The piston rod 23 constitutes "one of the piston rods (one piston rod)" in the inventions for achieving the first and third objects, and the distal end portion 25 of the piston rod 23 constitutes a "distal end portion of the stopper main body" in the invention for achieving the fourth object.

Although a so-called Y ring having a Y-shaped section is adopted for the seal rings 24, 28 of this embodiment as shown in FIG. 8, the invention is not limited thereto, a so-called O ring having a circular section or rings having other sectional shapes may be adopted.

Although the notches are formed in the piston main body 21 as the orifices in this embodiment, the invention is not limited thereto. For example, a through hole may be provided in the piston main body 21 as the orifice. Alternatively, a gap is provided between an inside diameter of a second cylindrical portion 32 of the first body 30A of the cylinder 30, and an outside diameter of the piston rod 23, and this gap may be used as the orifice.

Figure 4:
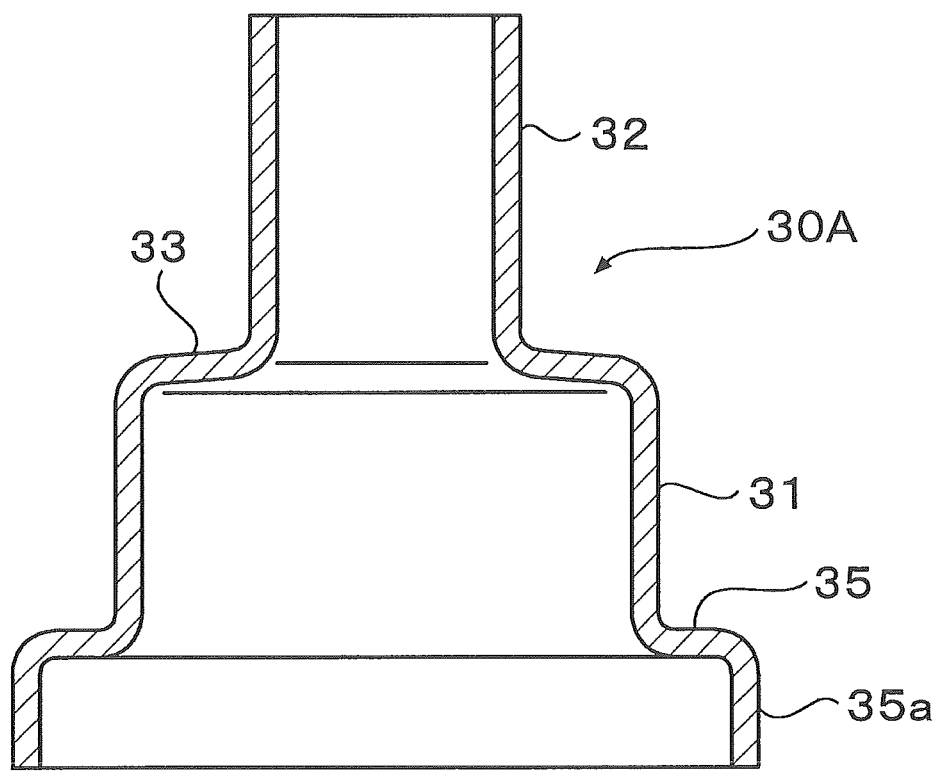
FIG. 4 is a sectional view of a first body of a cylinder which makes up the damper apparatus and the stopper apparatus.

In this embodiment, the cylinder 30 which accommodates the piston 20 slidably therein is made up of the first body 30A and the second body 30B which is coupled to the first body 30A. As shown in FIGS. 1, 4 and 8, the first body 30A has a first cylindrical portion 31, the second cylindrical portion 32, a connection wall 33 and a first flange portion 35. The first cylindrical portion 31 has a cylindrical shape, and accommodates the piston main body 21 slidably. The second cylindrical portion 32 extends continuously from one end portion of the first cylindrical portion 31 via the connection wall 33 while being reduced in diameter. The piston rod 23 is inserted through the second cylindrical portion 32. The first flange portion 35 is formed so as to extend radially outwards from a circumferential edge of the other end of the first cylindrical portion 31. In this embodiment, the second cylindrical portion 32 constitutes the "other of the cylindrical portions (other cylindrical portion)" in the inventions for achieving the first object.

As shown in FIG. 9, a length of the second cylindrical portion 32 is set such that the second cylindrical portion 32 does not abut the washer plate 50 even when the piston main body 21 maximally slides towards the second body 30B. Namely, the length of the second cylindrical portion 32 is set so that, as shown in FIG. 8, when the piston main body 21 being biased by the coil spring 55 abuts the connection wall 33 of the first body 30A to restrict its movement, a distance "b" between an upper end of the second cylindrical portion 32 and a lower end of the washer plate 50 is larger than a distance "a" between the piston main body 21 and the gasket 46.

As shown in FIG. 4, before the first body 30A is coupled to the second body 30B, a circumferential edge portion 35a of the first flange portion 35 has a cylindrical shape which extends in an axial direction of the first body 30A. As shown in FIGS. 4 and 8, the connection wall 33 which connects the first cylindrical portion 31 with the second cylindrical portion 32 is inclined towards the second cylindrical portion 32 as it extends in the axial direction.

The second body 30B, which is to be coupled to the first body 30A, has a third cylindrical portion 39 and a second flange portion 45. The third cylindrical portion 39 has a bottomed cylindrical shape, and supports slidably the other piston rod 27 of the piston 20. The second flange portion 45 extends radially outwards from a circumferential edge of an opening portion of the third cylindrical portion 39. The second flange portion 45 has a diameter smaller than an inside diameter of the circumferential portion 35a of the first flange portion 35. Namely, an outside diameter of the first flange portion 35 is made larger than an outside diameter of the second flange portion 45. In this embodiment, the third cylindrical portion 39 constitutes "one of the cylindrical portions (one cylindrical portion)" in the inventions for achieving the first object. The third cylindrical portion 39 of the second body 30B constitutes a "proximal end portion of the stopper main body" in the inventions for achieving the fourth object.

The second body 30B is coupled to the first body 30A by crimping the circumferential edge portion 35a of the first flange portion 35 over a front surface side of the second flange portion 45 (see FIGS. 3 and 8). As a result, the cylinder main body 30a is formed as a cylindrical case which is surrounded by the first cylindrical portion 31, the connection wall 33 and the first flange portion 35 of the first body 30A and the second flange portion 45 of the second body 30B, whereby the piston main body 21 is accommodated slidably therein (see FIGS. 3 and 8).

Namely, the first cylindrical portion 31 makes up a circumferential wall of a cylinder main body 30a, the connection wall 33 makes up a ceiling wall of the cylinder main body 30a, the second flange portion 45 makes up a bottom wall of the cylinder main body 30a, and the first flange portion 35 makes up a joint portion with the second flange portion 45. One end of the coil spring 55 is supported on this joint portion 48 (see FIGS. 8 to 10) of the first flange portion 35 and the second flange portion 45.

The annular gasket 46 made of fabric or rubber is disposed between the first flange portion 35 of the first body 30A and the second flange portion 45 of the second body 30B in order to enhance the sealing performance (see FIGS. 8 to 10). An inside diameter of the gasket 46 is made smaller than an inside diameter of the first cylindrical portion 31 of the first body 30A.

Figure 5A:
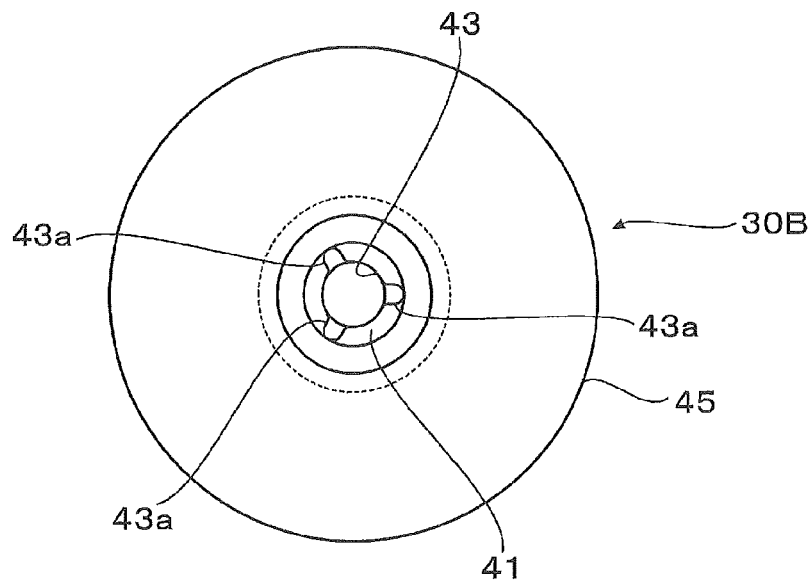
FIGS. 5A and 5B show a second body of the cylinder which makes up the damper apparatus and the stopper apparatus.
Figure 5B:
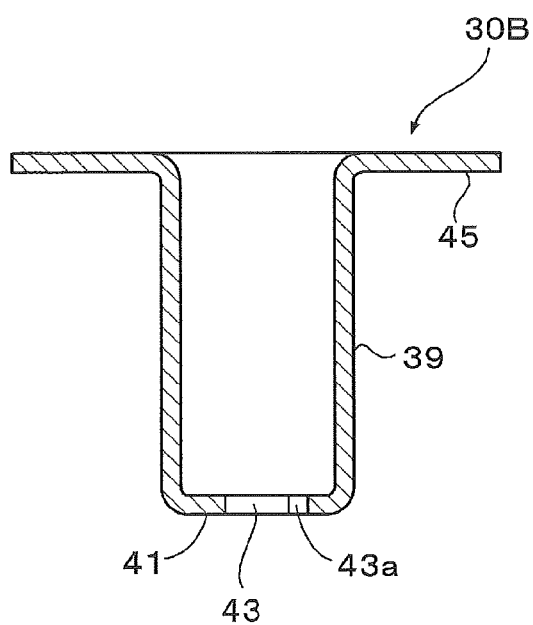

As shown at FIGS. 5A and 5B, a through hole 43 is formed in a center of a bottom portion 41 of the third cylindrical portion 39 of the second body 30B. Plural air releasing holes 43a are formed at equal intervals circumferentially along an outer circumference of the through hole 43. In this embodiment, three air releasing holes 43a are formed.

The third cylindrical portion 39 extends longer than the piston rod 27. Thus, a space portion 47 into which the piston rod 27 is not inserted even when the piston rod 27 slides is provided inside a distal end portion of the third cylindrical portion 39 (see FIGS. 8 and 9). The rivet 80 as the fixing device which fixes the cylinder 30 and the fastener 60 together has an engagement portion 80b, and the engagement portion 80b is disposed within the space portion 47. The piston rod 27 and the engagement portion 80b are made not to collide with each other even when the piston main body 21 maximally slides towards the second body 30B (see FIG. 9).

In a state in which the first body 30A and the second body 30B are coupled together, the piston main body 21 is accommodated slidably within the cylinder main body 30a, and the one piston rod 23 is supported slidably in the second cylindrical portion 32 of the first body 30A so as to extend out of the second cylindrical portion 32 from an opening at a distal end thereof. The other piston rod 27 is supported slidably in the third cylindrical portion 39 of the second body 30B, whereby the piston 20 is supported at both ends thereof (see FIGS. 3, 8 and 9).

Then, the piston rod 23 slides as the piston main body 21 slides within the cylinder 30 so that the projection amount of the piston rod 23 from the opening at the distal end of the second cylindrical portion 32 varies, whereby the stopper main body 15 is allowed to expand and contract.

As shown in FIG. 8, the seal ring 24 abuts an inner circumference of the second cylindrical portion 32 and the seal ring 28 abuts an inner circumference of the third cylindrical portion 39, whereby a viscous fluid R is sealed up in an interior of the cylinder 30. Thus, when the piston main body 21 slides within the cylinder 30, a braking force is applied to the piston main body 21 by a flowing resistance generated as the viscous fluid R passes through the orifices 21a.

The piston main body 21 is always biased by the coil spring 55 so as to abut the connection wall 33 of the first body 30A (see FIG. 8). When the piston main body 21 moves towards the second body 30B against the biasing force of the coil spring 55, the piston main body 21 abuts the gasket 46 to thereby be restricted from moving further (see FIG. 9).

The piston main body 21 may directly abut the second flange portion 45 of the second body 30B by crimping the first flange portion 35 and the second flange portion 45 together while preventing the protrusion of the gasket 46 from the inner circumference of the first cylindrical portion 31 or by crimping them together without using the gasket 46 when the first body 30A and the second body 30B are coupled. When the first flange portion 35 and the second flange portion 45 are crimped together without using the gasket 46, an adhesive may be interposed between the first flange portion 35 and the second flange portion 45 to seal a gap defined therebetween.

As described above, the stopper main body 15 of the inventions for achieving the fourth object is made up of the piston 20 and the cylinder 30 which supports the piston 20 slidably, and is allowed to expand and contract as the piston rod 23 projecting from the opening at the distal end of the second cylindrical portion 32 of the first body 30A slides. However, the invention is not limited to this construction. For example, a cylindrical member and a rod or an elastic rubber member accommodated therein may be adopted as the stopper main body, as long as the stopper main body is expandable and contractable while expanding and contracting the cover member 90.

The washer plate 50 is mounted at the distal end portion 25 of the piston rod 23, and the dislocation of the washer plate 50 is prevented by an E ring 56. As shown in FIGS. 1 and 2, an insertion hole 51 is formed in a center of the washer plate 50, and plural claw installation holes 52 are provided at equal intervals along an outer circumference of the insertion hole 51. Spring support claws 53 are cut to be erected in an outer circumference of the washer plate 50. As shown in FIG. 9, this washer plate 50 does not abut the second cylindrical portion 32 even when the piston main body 21 maximally slides towards the second body 30B.

An elastic abutment member 57 is mounted on the washer plate 50. The elastic abutment member 57 abuts a circumferential edge of the opening portion 3 of the vehicle. This elastic abutment member 57 is formed of an elastic material such as rubber, and plural installation claws 58 project from a rear surface side thereof. The installation claws 58 are inserted into the claw installation holes 52 in the washer plate 50 to be engaged therewith. A cutout hole 58a is formed in a center of each installation claw 58 so as to extend along the axial direction for enhancement of moldability and flexibility (see FIGS. 3 and 8).

The coil spring 55 is disposed on an outer circumference of the first body 30A of the cylinder 30. The coil spring 55 as the elastic member biases the one piston rod 23 so as to project out of the opening at the distal end of the second cylindrical portion 32 of the cylinder 30 and so as to abut the circumferential edge of the opening portion 3 of the vehicle. As shown in FIGS. 8 to 10, one end of the coil spring 55 is supported by abutting the joint portion 48 of the first flange portion 35 and the second flange portion 45, and the other end of the coil spring 55 is supported by abutting the washer plate 50 and by being hooked with the spring support claws 53 of the washer plate 50 inserted into an inner circumference of the coil spring 55 at a side of the distal end portion 25 of the piston rod 23 which projects out of the opening at the distal end of the second cylindrical portion 32. Thus, the one end of the coil spring 55 is supported by the joint portion 48, and the other end thereof is supported by the washer plate 50 which is mounted on the distal end portion 25 of the piston rod 23, whereby the coil spring 55 biases the piston rod 23 so as to project out of the opening at the distal end of the second cylindrical portion 32 and so as to abut the circumferential edge of the opening portion 3 of the vehicle.

The fastener 60 is attached to the third cylindrical portion 39 of the cylinder 30 so as to secure the cylinder 30 to the opening/closing member 5 or so as to secure a proximal end portion of the stopper main body 15 to the opening/closing member 5. The fastener 60 has a third flange portion 75 and an insertion portion 64. The third flange portion 75 engages with a circumferential edge on a front side of the attachment hole 7. The insertion portion 64 is inserted into the attachment hole 7 so as to be engaged with a circumferential edge on a rear side of the attachment hole 7. The insertion portion 64 has an accommodating cylindrical portion 61 and engagement claws 73. The accommodating cylindrical portion 61 having a bottomed cylindrical shape is inserted into the attachment hole 7 (see FIG. 8) in the opening/closing member 5, and accommodates the third cylindrical portion 39 of the cylinder 30. The engagement claws 73 engage with the circumferential edge on the rear side of the attachment hole 7. The third flange portion 75 which directly or indirectly engages with the circumferential edge on the front side of the attachment hole 7 extends radially outwards from a circumferential edge of an opening portion at a distal end of the accommodating cylindrical portion 61. The third flange portion 75 constitutes a "flange portion" of the fastener in the inventions for achieving the first object, and the engagement claws 73 constitute a "fixing member" for engaging with the attachment hole 7 in the same inventions. The third flange portion 75 constitutes a "flange portion" in the inventions for achieving the fourth object, and the accommodating cylindrical portion 61 constitutes a "cylindrical portion" in the same inventions. An inside diameter of the accommodating cylindrical portion 61 is made larger than an outside diameter of the third cylindrical portion 39 of the cylinder 30.

Figure 6A:
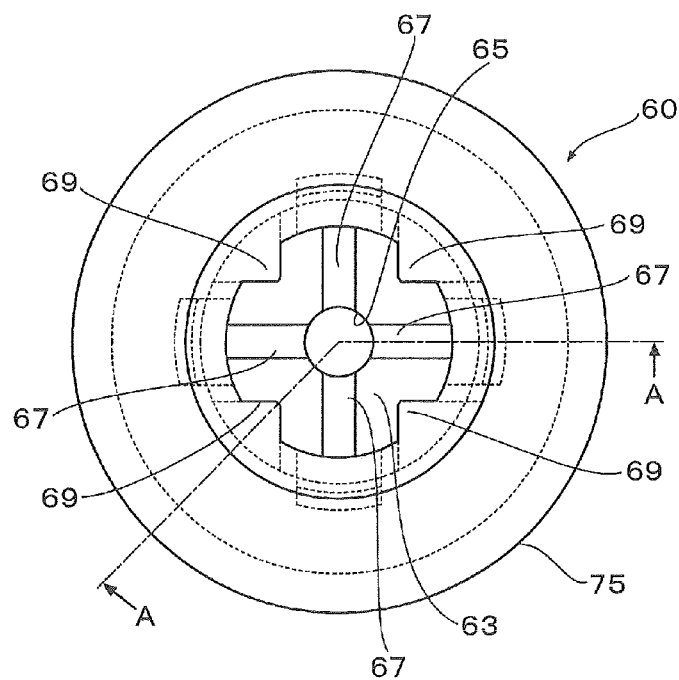
FIGS. 6A and 6B show a fastener which makes up the damper apparatus and the stopper apparatus.
Figure 6B:
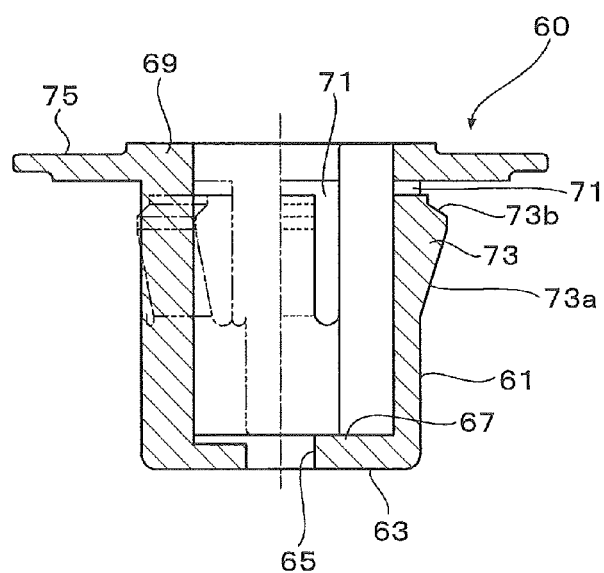

As shown at FIGS. 6A and 6B, a through hole 65 is formed in a center of a bottom portion 63 of the accommodating cylindrical portion 61, and plural projecting portions 67 are formed on an inner surface of the bottom portion 63. The projecting portions 67 project from the bottom portion 63 in an axial direction of the through hole 65, and extend radially from a center of the through hole 65, while being spaced equally apart from each other. In this embodiment, the plural projecting portions 67 are formed into a cross-like shape.

As shown in FIG. 8, the rivet 80 has a shaft portion 80a, the engagement portion 80b and an umbrella-shaped portion 80c. The shaft portion 80a is inserted into the through hole 43 in the cylinder 30 and the through hole 65 in the fastener 60, the engagement portion 80b is disposed within the space portion 47 in the cylinder 30 so as to be engaged with a circumferential edge of the through hole 43, and the umbrella-shaped portion 80c engages with a circumferential edge of the through hole 65 in the fastener 60, whereby the fastener 60 is fixed to the cylinder 30 via the rivet 80. This rivet 80 constitutes a "fixing device" in the inventions for achieving the fourth object. Various tools other than the rivet 80 such as a bolt and a nut, an industrial fastener or the like can be adopted for fixing the cylinder 30 and the fastener 60 together, and hence, there is imposed no specific limitation on how to fix the fastener 60 to the cylinder 30.

In this state, as shown in FIG. 8, the bottom portion 41 of the cylinder 30 abuts the projecting portions 67 to define a gap S1 between the bottom portion 63 of the fastener 60 and the bottom portion 41 of the cylinder 30. This gap S1 communicates with the space portion 47 in the third cylindrical portion 39 via the air releasing holes 43a which are provided in the through hole 43.

Plural elongated projections 69 being arranged at equal intervals in a circumferential direction project from an inner circumference of the accommodating cylindrical portion 61 so as to extend along the axial direction from the opening at the distal end to the bottom portion 63 of the accommodating cylindrical portion 61 while (see FIGS. 6A and 6B). As shown at FIG. 6A, when the accommodating cylindrical portion 61 is seen from the axial direction, the elongated projections 69 of this embodiment project radially inwards so as to each form a substantially triangular shape, and are disposed between the plural projecting portions 67 formed on the bottom portion 63. When the fastener 60 is fixed to the cylinder 30 via the fastener 60, a gap S2 is defined between the inner circumference of the accommodating cylindrical portion 61 of the fastener 60 and an outer circumference of the third cylindrical portion 39 of the cylinder 30 (see FIG. 8). As shown in FIGS. 8 and 10, this gap S2 communicates with the gap S1.

The engagement claws 73 as the fixing member which engage with the circumferential edge on the rear side of the attachment hole 7 (see FIG. 10) in the opening/closing member 5 are formed flexibly via U-shaped slits 71 (see FIGS. 1 and 6B) on an outer circumference of the accommodating cylindrical portion 61 in positions situated between the plural elongated projections 69. As shown in FIGS. 3, 6A and 6B, each of the engagement claws 73 has a tapered portion 73a and an engagement step portion 73b. The tapered portion 73a projects gradually radially outwards of the accommodating cylindrical portion 61. The engagement step portion 73b is provided at a distal end portion of the tapered portion 73a so as to be engaged with the circumferential edge on the rear side of the attachment hole 7. For example, a pair of leg portions which extend into an anchor-like shape from an outer circumference of a proximal end of the accommodating cylindrical portion 61 may be used as the fixing member for engaging with the attachment hole, and hence, there is imposed no specific limitation on the fixing member.

As shown in FIG. 10, with the fastener 60 fixed to the cylinder 30 by the rivet 80, the first flange portion 35 and the second flange portion 45 of the cylinder 30 are positioned above an upper surface of the third flange portion 75, and a gap S3 is defined therebetween. As shown in FIGS. 8 to 10, this gap S3 communicates with the gap S2.

While the third cylindrical portion 39 of the cylinder 30 is inserted into the attachment hole 7 via the fastener 60 to be secured therein, the other portion of the cylinder 30 than the third cylindrical portion 39 projects from the attachment hole 7 to the front side thereof, and the projecting portion is covered by the expandable/contractable cover member 90.

Also, the stopper main body 15 in the inventions for achieving the fourth object is secured in the attachment hole 7 at the proximal end portion thereof (the third cylindrical portion 39) via the fastener 60, and the other portion of the stopper main body 15 other than the proximal end portion projects from the attachment hole 7 to the front side thereof, and this projecting portion is covered by the expandable/contractable cover member 90.

This cover member 90 is formed of an elastic material such as rubber. As shown in FIGS. 1, 3, 7A and 7B, the cover member 90 has a proximal end portion 91 which has an annular shape and which is joined to the third flange portion 75 of the fastener 60, an expandable/contractable cylindrical portion 95, which is provided continuously to the proximal end portion 91 and which has an accordion shape, and an annular distal end cover portion 97 which is provided so as to extend from a distal end portion of the expandable/contractable cylindrical portion 95.

Figure 7A:
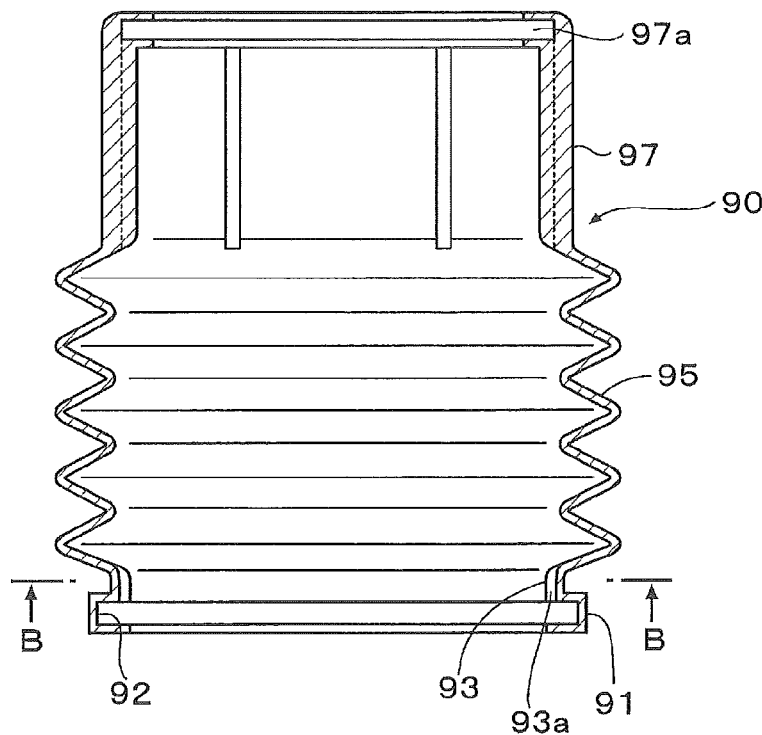
FIGS. 7A and 7B show a cover member which makes up the damper apparatus and the stopper apparatus.

As shown at FIG. 7A, an annular groove 92 is formed in an inner circumference of the proximal end portion 91 at an opening side thereof, and an upper portion of the annular groove 92 constitutes a projecting portion 93 which projects radially inwards. Then, by securely fitting the annular groove 92 on the outer circumference of the third flange portion 75 of the fastener 60, the proximal end portion 91 of the cover member 90 is mounted on the fastener 60. In this state, the projecting portion 93 is closely secured to an outer circumference of the first flange portion 35 of the cylinder 30 (see FIGS. 8 to 10).

Figure 7B:
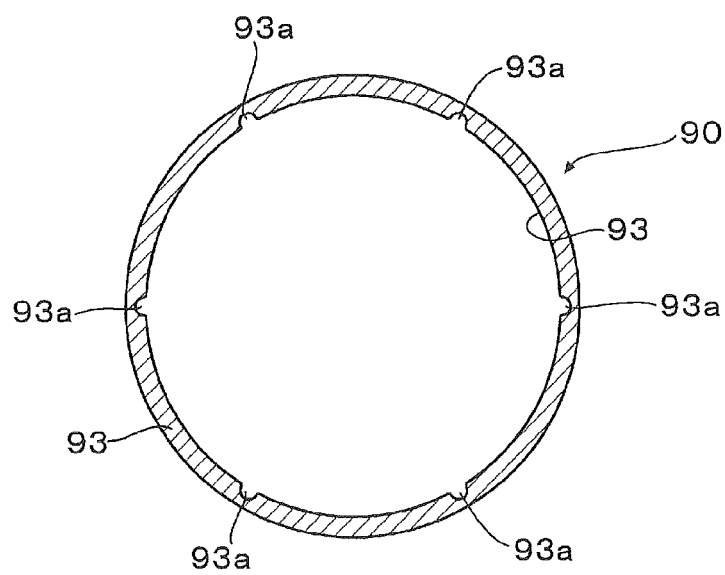

As shown at FIG. 7B, plural air releasing grooves 93a which extend in the axial direction are formed in an inner circumference of the projecting portion 93 so as to be arranged at equal intervals in a circumferential direction. With the cover member 90 mounted on the fastener 60 and the projecting portion 93 closely secured to the outer circumference of the first flange portion 35, air residing between the cylinder 30 and the cover member 90 can be discharged to an exterior of the cover member 90 through the air releasing grooves 93a.

An annular groove 97a is formed in an inner circumference of the distal end cover portion 97. By securely fitting this annular groove 97a on an outer circumference of the elastic abutment member 57 mounted on the washer plate 50, the distal end cover portion 97 of the cover member 90 is mounted on the elastic abutment member 57 (see FIG. 8). The distal end cover portion 97 is mounted on the elastic abutment member 57, and the proximal end portion 91 is mounted on the third flange portion 75 of the fastener 60, whereby the first body 30A of the cylinder 30, the piston rod 23 and the coil spring 55 are covered by the cover member 90.

An annular seal member 82 which is made of a foamed material is disposed on a rear surface side of the third flange portion 75 of the fastener 60 (see FIG. 2). As a result, as shown in FIGS. 8 and 10, when the proximal end portion of the stopper main body 15 is secured to the attachment hole 7 via the fastener 60, an end edge portion of the proximal end portion 91 of the cover member 90 is joined while being sandwiched by the third flange portion 75 and the seal member 82 therebetween.

The seal member 82 is made larger than an outside diameter than the third flange portion 75 of the fastener 60 and larger than an outside diameter of a joint portion of the cover member 90 with the third flange portion 75, that is, an outside diameter of the proximal end portion 91 of the cover member 90. Because of this, in a state as shown in FIG. 10, an outer circumferential edge portion 82a of the seal member 82 bulges from an outer circumference of the proximal end portion 91 of the cover member 90.

Next, the working effect of the damper apparatus and the stopper apparatus which are constructed as described above will be described.

Firstly, assembling work will be described. The cylinder 30, the piston 20 and the coil spring 55 will be assembled as follows, for example. Also, the stopper main body 15 which is made up of the cylinder 30 and the piston 20 and the coil spring 55 which is disposed on the outer circumference of the stopper main body 15 will be assembled as follows, for example.

Namely, the piston rod 23 is inserted into the second cylindrical portion 32 of the first body 30A, and the piston main body 21 is accommodated in the first cylindrical portion 31 of the first body 30A. Then, the viscous fluid R such as a silicone oil or grease is filled in the first cylindrical portion 31, and the annular gasket 46 (see FIG. 1) is disposed on a rear surface side of the first flange portion 35 of the first body 30A.

Thereafter, the second flange portion 45 of the second body 30B is disposed in an inner circumference of the circumferential edge portion 35a of the first flange portion 35, such that the gasket 46 is sandwiched by both the flange portions 35, 45 therebetween, and the piston rod 27 is inserted into the third cylindrical portion 39 of the second body 30B. By crimping the circumferential portion 35a of the first flange portion 35 over the front surface side of the second flange portion 45 in this state, the second body 30B is coupled to the first body 30A (see FIGS. 3 and 8). Since the gasket 46 is sandwiched between the first flange portion 35 and the second flange portion 45, the gap between both the flange portions 35, 45 can be sealed up so as to enhance the sealing performance of both the flange portions.

This forms the cylinder main body 30*a* as the cylindrical case which is surrounded by the first cylindrical portion 31, the connection wall 33 and the first flange portion 35 of the first body 30A and the second flange portion 45 of the second body 30B. The piston main body 21 is accommodated slidably in the cylinder main body 30*a*, and the piston rod 23 is supported slidably in the second cylindrical portion 32 of the first body 30A, while the piston rod 27 is supported slidably in the third cylindrical portion 39 of the second body 30B, thus, the piston 20 being supported at both ends thereof (see FIGS. 3, 8 and 9).

As described above, in this embodiment, the first body 30A and the second the second body 30B are coupled by crimping the first flange portion 35 and the second flange portion 45 each having a flat plane shape, thereby facilitating coupling of the first body 30A and the second body 30B.

In this embodiment, the cylinder 30 in which the piston main body 21 can be supported slidably by the first cylindrical portion 31 while the pair of piston rods 23, 27 are supported slidably by the second cylindrical portion 32 and the third cylindrical portion 39, respectively, can be made up only of the two members, that is, the first body 30A and the second body 30B. Thus, the necessity of the upper bearing member and the lower bearing member of the front fork described in Patent Literature 3 is obviated, thereby reducing the number of constituent elements and simplifying the construction.

Next, the coil spring 55 is placed on the outer circumference of the first body 30A of the cylinder 30, and the one end of the coil spring 55 is supported on the joint portion 48 of the first flange portion 35 and the second flange portion 45, specifically, by abutting the front surface of the first flange portion 35. Then, the distal end portion 25 of the piston rod 23 is inserted through the insertion hole 51 in the washer plate 50, the washer plate 50 is supported by a step portion 25*b* (see FIG. 8) of the distal end portion 25, and the E ring 56 is installed in the E ring installation groove 25*a*. As a result, the washer plate 50 is mounted on the distal end portion 25 of the piston rod 23 while being prevented from being dislocated. In this state, one end of the coil spring 55 is supported by the joint portion 48 of the first flange portion 35 and the second flange portion 45, while the other end thereof is supported by the washer plate 50. Thus, the coil spring 55 is interposed between the washer plate 50 and the first flange portion 35 of the cylinder 30 in a contracted state, whereby the piston rod 23 is biased towards the opening portion 3 of the vehicle via the washer plate 50.

By attaching the rigid washer plate 50 to the end portion of the piston rod 23, the corresponding one end of the coil spring 55 can be held firmly, while simplifying the configuration.

As described above, the coil spring 55 is disposed on the outer circumference of the cylinder 30 such that one end of the coil spring 55 is supported by the joint portion 48 of the first flange portion 35 and the second flange portion 45, while the other end thereof is supported by the washer plate 50. Thus, compared with the construction of the front fork described in Patent Literature 3 in which the springs are disposed inside the vehicle-body-side tube and the wheel-side tube, the high spring force can be obtained while using the coil spring 55 having the sufficient outside diameter. Because of this, the high spring force can be obtained without increasing the overall length of the coil spring 55, and the overall length of the cylinder 30 can be reduced, thereby making the cylinder 30 compact in size and saving the installation space for the cylinder 30.

In this embodiment, the outside diameter of the first flange portion 35 is formed larger than the outside diameter of the second flange portion 45, and the circumferential portion 35*a* of the first flange portion 35 is crimped over the front surface side of the second flange portion 45. As a result, the one end of the coil spring 55 can be supported not on the circumferential edge portion 35*a* of the first flange portion 35 which is to be crimped but on the flat surface portion having an accurate flatness, whereby the coil spring 55 can be disposed in a stable posture while the inclination thereof is suppressed.

As shown in FIG. 2, the plural installation claws 58 of the elastic abutment member 57 are aligned with the plural claw installation holes 52, and the elastic abutment member 57 is then pushed down so that the installation claws 58 are pushed respectively into the corresponding claw installation holes 52 to be engaged therewith, whereby the elastic abutment member 57 is mounted on the front surface of the washer plate 50.

Then, the cylinder 30 is attached to the fastener 60 at the third cylindrical portion 39, as the one cylindrical portion, thereof. More specifically, firstly, the third cylindrical portion 39 of the cylinder 30 is inserted into the accommodating cylindrical portion 61 of the fastener 60, so that the bottom portion 41 thereof abuts the projecting portions 67 of the bottom portion 63 of the fastener 60. Since the plural elongated projections 69 are formed on the inner circumference of the accommodating cylindrical portion 61 of the fastener 60 such that elongated projections 69 extend in the axial direction and project radially inwards into the substantially triangular shape when viewed in the axial direction as shown at FIGS. 6A and 6B, distal end portions of the elongated projections 69 are disposed near the outer circumference of the third cylindrical portion 39 of the cylinder 30 so that the third cylindrical portion 39 of the cylinder 30 can be supported firmly without becoming loose.

In this state, as shown in FIGS. 3 and 8, the shaft portion 80*a* of the rivet 80 is inserted into both the through hole 43 in the cylinder 30 and the through hole 65 in the fastener 60 and is then crimped, whereby the engagement portion 80*b* which is disposed within the space portion 47 defined in the cylinder 30 engages with the circumferential edge of the through hole 43, while the umbrella-shaped portion 80*c* engages with the circumferential edge of the through hole 65 in the fastener 60, thereby fixing the fastener 60 to the cylinder 30 via the rivet 80. In this state, the gap S2 is defined between the outer circumference of the accommodating cylindrical portion 61 of the fastening portion 60 and the inner circumference of the third cylindrical portion 39 of the cylinder 30.

Then, in this state, the engagement claws 73 which are formed via the U-shaped slits 71 on the outer circumference of the accommodating cylindrical portion 61 at the portions situated between the plural elongated projections 69 (see FIGS. 6A and 6B) are aligned with the gap S2. This can ensure a sufficient margin for deflection of the engagement claws 73. Thus, the engagement claws 73 can be deflected easily when the accommodating cylindrical portion 61 of the fastener 60 is inserted into the attachment hole 7.

In this embodiment, since the space portion 47 where the piston rod 27 is not inserted is provided at the distal end portion of the third cylindrical portion 39 of the cylinder 30, the rivet 80 which fixes the cylinder 30 and the fastener 60 together can be provided using the space portion 47, whereby the fixing construction of both the members can be simplified. Since the cylinder 30 and the fastener 60 are fixed together such that the third cylindrical portion 39 of the cylinder 30 is accommodated in the accommodating cylindrical portion 61 of the fastener 60, it is possible to save the installation space for both the members.

In this embodiment, the third cylindrical portion 39 which is the proximal end portion of the stopper main body 15 can be fixed to the bottom surface of the accommodating cylindrical portion 61 of the fastener 60 using the rivet 80 as the fixing device. Namely, since the cylinder 30 and the fastener 60 are fixed together such that the third cylindrical portion 39 of the stopper main body 15 is accommodated in the accommodating cylindrical portion 61 of the fastener 60, the fixing construction of both the members can be simplified, and the installation space for both the members can be saved.

After the third cylindrical portion 39 of the cylinder 30 is fixed to the fastener 60, the cover member 90 is placed over the cylinder 30 from the side of the proximal end portion 91, and the annular groove 92 in the proximal end portion 91 is securely fitted on the outer circumference of the third flange portion 75 of the fastener 60, while the annular groove 97*a* in the distal end cover portion 97 is securely fitted on the outer circumference of the elastic abutment member 57. Thus, the cover member 90 is mounted on the outer circumference of the first body 30A of the cylinder 30, whereby the first body 30A of the cylinder 30, the piston rod 23 and the coil spring 55 are covered (see FIG. 3).

Specifically, the projecting portion 93 provided at the proximal end portion 91 is closely secured to the outer circumference of the first flange portion 35 of the cylinder 30 (see FIGS. 8 and 10). Thus, the proximal end portion 91 can be supported firmly without any looseness, and the cylindrical portion 95 is allowed to expand and contract in a smooth fashion.

The damper apparatus 10 and the stopper apparatus 100 which are assembled as described above are attached to the attachment hole 7 in the opening/closing member 5 via the fastener 60. In attaching them to the attachment hole 7, as shown in FIG. 2, the annular seal member 82 is mounted on the outer circumference of the accommodating cylindrical portion 61 of the fastener 60, and the accommodating cylindrical portion 61 of the fastener 60 is inserted into the attachment hole 7 in that state.

As the tapered portions 73*a* are pressed against by the inner circumference of the attachment hole, the engagement claws 73 are deflected inwards. Then, as the engagement step portions 73*b* ride over the attachment hole 7, the engagement claws 73 are elastically restored to their original positions, and the engagement step portions 73*b* engage with the circumferential edge on the rear side of the attachment hole 7.

At the same time, the third flange portion 75 indirectly engages with the circumferential edge on the front side of the attachment hole 7 via the sea member 82 as shown in FIGS. 8 to 10. In this state, the seal member 82 abuts the circumferential edge on the front side of the attachment hole 7, and the end edge portion of the proximal end portion 91 of the cover member 90 joined to the fastener 60 is sandwiched by the third flange portion 75 of the fastener 60 and the seal member 82 therebetween.

As the proximal end portion 91 of the cover member 90 slightly deforms the seal member 82, the outer circumferential edge portion 82*a* of the seal member 82 bulges from an outer circumference of the cover member 90 (see FIG. 10).

As described above, the third flange portion 75 of the fastener 60 indirectly engages with the circumferential edge on the front side of the attachment hole 7 via the seal member 82, and the engagement claws 73 engage with the circumferential edge on the rear side of the attachment hole 7, whereby with the circumferential edges of the attachment hole 7 sandwiched, the damper apparatus 10 or the stopper apparatus 100 can be attached to the attachment hole 7.

Since the damper apparatus 10 or the stopper apparatus 100 can be attached to the attachment hole 7 via the fastener 60, compared with the stopper described in Patent Literature 1 in which the restriction member of hard rubber is secured to the vehicle body panel by the securing member such as the adhesive, the bolt or the like, the efficiency of the attaching work of the damper apparatus 10 or the stopper apparatus 100 to the attachment hole 7 can be enhanced.

The damper apparatus 10 or the stopper apparatus 100 is attached to the attachment hole 7 such that the portion of the cylinder 30 or the stopper main body 15 which projects from the attachment hole 7 to the front side thereof is covered by the cover member 90, and such that the proximal end portion 91 of the cover member 90 is joined to the third flange portion 75 of the fastener 60. Therefore, the contact of water such as rain water or the like to the cylinder 30 or the stopper main body 15 or ingress of rain water or the like into the interior of the cover member 90 can be prevented.

In this embodiment, the cylinder 30 can be fixed to the attachment hole 7 by the engagement claws 73 as the fixing member in a state in which the third cylindrical portion 39, as the one cylindrical portion, of the cylinder 30 is inserted into the accommodating cylindrical portion 61 of the fastener 60. Therefore, the projecting amount of the third cylindrical portion 39 of the cylinder 30 from the rear side of the attachment hole 7 can be reduced, thereby saving the installation space for the cylinder 30.

In this embodiment, the damper apparatus 10 or the stopper apparatus 100 is described as being attached to the attachment hole 7 in the opening/closing member 5. However, an attachment hole may be formed in the circumferential edge of the opening portion 3 of the vehicle, and the damper apparatus 10 or the stopper apparatus 100 may be attached to the circumferential edge of the opening portion 3 of the vehicle.

In this embodiment, when the damper apparatus 10 or the stopper apparatus 100 is attached to the attachment hole 7, the end edge portion of the proximal end portion 91 of the cover member 90 is joined to the fastener 60 while being sandwiched by the third flange portion 75 of the fastener 60 and the seal member 82 therebetween. Therefore, since the end edge portion of the proximal end portion 91 of the cover member 90 can be fixed while enhancing the sealing performance, the ingress of water such as rain water or the like into the interior of the cover member 90 from the gap between the third flange portion 75 and the seal member 82 can be prevented in a more ensured fashion.

Similarly, in this embodiment, in the state in which the damper apparatus 10 or the stopper apparatus 100 is attached to the attachment hole 7, the outer circumferential edge portion 82*a* of the seal member 82 bulges from the outer circumference of the cover member 90. Therefore, the dislocation of the cover member 90 from the outer circumference of the third flange portion 75 of the fastener 60 can be prevented.

Then, when the opening/closing member 5 is closed from the state in which the opening portion 3 of the vehicle is opened as shown in FIG. 11, the distal end portion of the piston rod 23 which projects from the opening at the distal end of the second cylindrical portion 32 of the cylinder 30 indirectly abuts the circumferential edge of the opening portion 3 via the elastic abutment member 57, and the piston rod 23 is pushed in towards the second body 30B of the cylinder 30 while contracting the expandable/contractable cylindrical portion 95 of the cover member 90 against the biasing force of the coil spring 55.

Then, the piston rods 23, 27 slide within the second cylindrical portion 32 and the third cylindrical portion 39, respectively, and the piston main body 21 slides within the first cylindrical portion 31, thereby generating the flowing resistance as the viscous fluid R passes through the orifices 21a. And, in association with this, the expandable/contractable cylindrical portion 95 of the cover member 90 contracts.

In this embodiment, the piston rods 23, 27 which project from both the surfaces of the piston main body 21 are slidably supported by the second cylindrical portion 32 of the first body 30A and the third cylindrical portion 39 of the second body 30B, respectively, whereby the piston 20 is supported at both the ends thereof. Thus, the inclination of the piston main body 21 can be prevented, whereby the piston main body 21 is allowed to slide smoothly within the first cylindrical portion 31.

When the piston main body 21 moves further within the first cylindrical portion 31, the piston main body 21 abuts the gasket 46 which projects from the inner circumferential surface of the second cylindrical portion 32 of the first body 30A. Thus, further movement thereof is restricted, and the piston rod 27 which slides within the third cylindrical portion 39 of the second body 30B stops before the engagement portion 80b of the rivet 80 (see FIG. 9).

As described above, in this embodiment, when the piston rod 23 is pushed in towards the second body 30B against the biasing force of the coil spring 55, the piston main body 21 indirectly abuts the second flange portion 45 of the second body 30B via the gasket 46. Therefore, the sliding operation of the piston main body 21 can be restricted using the second body 30B of the cylinder 30. Since the sliding operation of the piston main body 21 is restricted by the second body 30B, not by the first body 30A, the application of a large load from the piston main body 21 to the first body 30A having a complex configuration and a high deformability can be prevented, thereby preventing the deformation and damage to the first body 30A.

In particular, in this embodiment, the piston main body 21 is restricted from further moving by indirectly abutting the second flange portion 35 of the second body 30B via the gasket 46 so that an outer circumferential edge portion of the piston main body 21 can be supported firmly by the flat and large supporting surface of the second flange portion 45. Thus, in addition to preventing the application of the load from the piston main body 21 to the first body 30A and the deformation and damage to the first body 30A, since the piston main body 21 is restricted from further moving by abutting the gasket 46, the direct abutment of the piston main body 21 with the second flange portion 45 of the second body 30B can also be prevented. Therefore, the generation of collision noise or wear of the piston main body 21 and the second body 30B can be suppressed.

In this embodiment, the length of the second cylindrical portion 32 of the first body 30A is set so that the washer plate 50 does not abut the second cylindrical portion 32 of the first body 30A when the piston main body 21 abuts the gasket 46 (see FIG. 9). Therefore, a large load is prevented from being applied to the second cylindrical portion 32, thereby preventing the deformation of the first body 30A.

In this embodiment, the length of the third cylindrical portion 39 of the second body 30B is set so that the gap is defined between the piston rod 27 and the engagement portion 80b of the rivet 80 when the piston main body 21 abuts the gasket 46. Therefore, the piston rod 27 can be prevented from abutting the engagement portion 80b of the rivet 80, thereby preventing the generation of collision noise or wear of both the members.

When the piston rod 23 is pushed in towards the second body 30B of the cylinder 30 and the expandable/contractable cylindrical portion 95 contracts, air in the interior of the cover member 90 communicates from the insertion portion 64 of the fastener 60 to the exterior of the fastener 60 on the rear side of the attachment hole 7 through the gap between the cylinder 30 and the fastener 60.

Namely, air in the interior of the cover member 90 is discharged from the air releasing grooves 93a in the cover member 90 as indicated by arrows in FIG. 10, passes through the gap S3 which is defined between the first flange portion 35 and the second flange portion 45 of the cylinder 30 and the third flange portion 75 of the fastener 60 and flows to the gap S2 which is defined between the inner circumference of the accommodating cylindrical portion 61 of the fastener 60 and the outer circumference of the third cylindrical portion 39 of the cylinder 30. The air passes through the slits 71 which are formed in the accommodating cylindrical portion 61 of the fastener 60, and is then discharged to the exterior of the fastener 60. When the damper apparatus 10 is attached to the attachment hole 7 in the opening/closing member 5 as in this embodiment, the air in the interior of the cover member 90 is discharged into the opening/closing member 5.

In the damper apparatus 10, the air in the interior of the cover member 90 is not trapped therein when the piston rod 23 retracts, because the air in the interior of the cover member 90 is allowed to communicate to the exterior of the fastener 60 through the above-described path, thereby facilitating the closure of the opening/closing member 5. On the other hand, if there is no escaping passage, the damper apparatus 10 may constitute a pneumatic spring which provides the resistance against the closure of the opening/closing member 5. Since the air in the interior of the cover member 90 is discharged from the air releasing grooves 93a, the cover member 90 can be contracted smoothly while maintaining its according configuration, without causing the deformation of the expandable/contractable cylindrical portion 95. Thus, a smooth expanding and contracting operation of the cover member 90 is attained.

As indicated by arrows in FIG. 9, air in the interior of the space portion 47 in the third cylindrical portion 39 is discharged from the air releasing holes 43a in the through hole 43 (see FIGS. 5A and 5B) in the third cylindrical portion 39 as the piston rod 27 slides, passes through the gap S1 which is defined between the bottom portion 63 of the fastener 60 and the bottom portion 41 of the cylinder 30 and flows to the gap S2 which is defined between the inner circumference of the accommodating cylindrical portion 61 of the fastener 60 and the outer circumference of the third cylindrical portion 39 of the cylinder 30. Then, the air further passes through the sits 71 which are formed in the accommodating cylindrical portion 61 of the fastener 60 and is eventually discharged to the exterior of the fastener 60.

Namely, in this embodiment, the gap S1 is defined by between the bottom portion 41 of the of the cylinder 30 in which the air releasing holes 43a are formed in the through hole 43 and the bottom portion 63 of the fastener 60 on which the projecting portions 67 are formed, and the air residing in the interior of the third cylindrical portion 39 of the cylinder 30 is allowed to communicate to the exterior of the fastener 60 through the slits 71 after passing through the air releasing holes 43a and the gap S1. Therefore, the ingress and egress of air into and out of the third cylindrical portion 39 of the cylinder 30 can be executed smoothly, thereby reducing the sliding resistance of the piston 20.

Then, the opening/closing member 5 is locked to close the opening portion 3 by a locking apparatus, not shown, such that the distal end portion of the piston rod 23 indirectly abuts the circumferential edge of the opening portion 3 via the elastic abutment member 57. As a result, the opening/closing member 5 is always biased in the direction in which the opening/closing member 5 is opened from the opening portion 3 of the vehicle. Therefore, the looseness of the opening/closing member 5 in the locked state can be prevented.

As described above, the distal end portion 25 of the piston rod 23 is biased via the washer plate 50 by the biasing force of the coil spring 55. In this damper apparatus 10, since the sufficient outside diameter can be ensured for the coil spring 55, the sufficient biasing force can be obtained to bias the piston rod 23, thereby preventing the looseness of the opening/closing member 5 in an ensured fashion.

The one end of the coil spring 55 is supported by the flat surface portion of the first flange portion 35 having an accurate flatness and is hence disposed in a stable posture while being restrained from being inclined. Thus, the coil spring 55 can transmit its biasing force to the distal end portion 25 of the piston rod 23 with good accuracy via the washer plate 50.

When vibration is generated in the vehicle during driving or idling in the state in which the opening/closing member 5 is locked to close the opening portion 3, the sympathetic vibration of the opening/closing member 5 may be caused. However, the damper apparatus 10 can damps the vibration of the opening/closing member 5, because the piston rod 23 which abuts the opening/closing member 5 via the elastic abutment member 57 slides depending on the vibration of the opening/closing member 5, and the piston main body 21 also moves within the first cylindrical portion 31 while causing a braking force by the flowing resistance generated as the viscous fluid R passes through the orifices 21a. As a result, the sympathetic vibration of the opening/closing member 5 can be prevented, whereby the generation of uncomfortable noise inside the passenger compartment and the uncomfortable feeling can be prevented.

In this embodiment, as shown in FIGS. 4 and 8, the connection wall 33 which connects the first cylindrical portion 31 with the second cylindrical portion 32 of the first body 30A is inclined so as to project in the axial direction as it extends towards the second cylindrical portion 32. Thus, as shown in FIG. 10, even when the piston main body 21 slides towards the first body 30A within the first cylindrical portion 31 to thereby abut the connection wall 33, the contacting area of the piston main body 21 with the connection wall 33 can be reduced relatively. Therefore, the piston main body 21 can be prevented from sticking to the connection wall 33 so as not to be separated therefrom. When the piston main body 21 slides towards the first body 30A within the first cylindrical portion 31, air residing in the cylinder 30 can be guided towards the second cylindrical portion 32 along the inclination of the connection wall 33 as indicated by the arrows in FIG. 10, so that the air is not involved between the piston main body 21 and the inner circumference of the cylinder 30.

Figure 12:
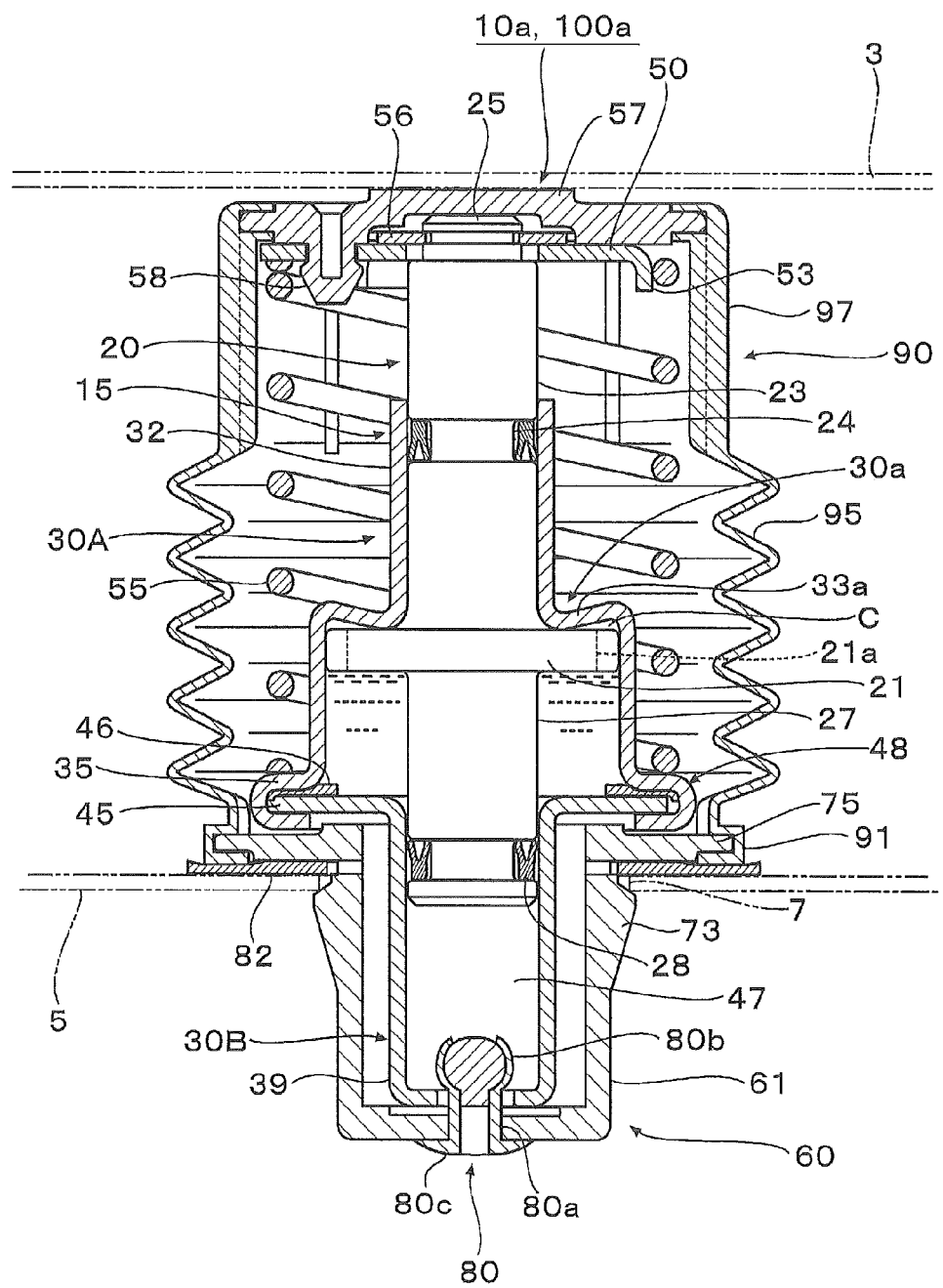
FIG. 12 is a sectional view of a fastener which makes up another embodiment of a vehicle opening/closing member damper apparatus and a vehicle opening/closing member stopper apparatus according to the invention.

FIG. 12 shows another embodiment of a vehicle opening/closing member damper apparatus and a vehicle opening/closing member stopper apparatus according to the invention. Like reference numerals will be given to like constituent components of the previous embodiment, and the description thereof will be omitted.

A vehicle opening/closing member damper apparatus 10a ("damper apparatus 10a") and a vehicle opening/closing member stopper apparatus 100a ("stopper apparatus 100a") according to this embodiment differ from those of the previous embodiment in the configuration of a connection wall 33a which connects a first cylindrical portion 31 with a second cylindrical portion 32 of a first body 30A.

The connection wall 33a of the damper apparatus 10a and the stopper apparatus 100a is inclined so as to be depressed in the axial direction as it extends towards the second cylindrical portion 32. In this form of the invention, similar to the previous embodiment, even when a piston main body 21 abuts the connection wall 33a, since the contacting area of the piston main body 21 with the connection wall 33a is relatively small, the sticking of the piston main body 21 to the connection wall 33a can be prevented. The piston main body 21 abuts a bend portion between the connection wall 33a and the second cylindrical portion 32 to stop, and this bend portion constitutes a top dead center of an upward motion of the piston main body 21. Therefore, a space C (see FIG. 12) in which air is stored can be ensured above the top dead center, so that the air is not involved between the piston main body 21 and the inner circumference of the cylinder 30.

Figure 13:
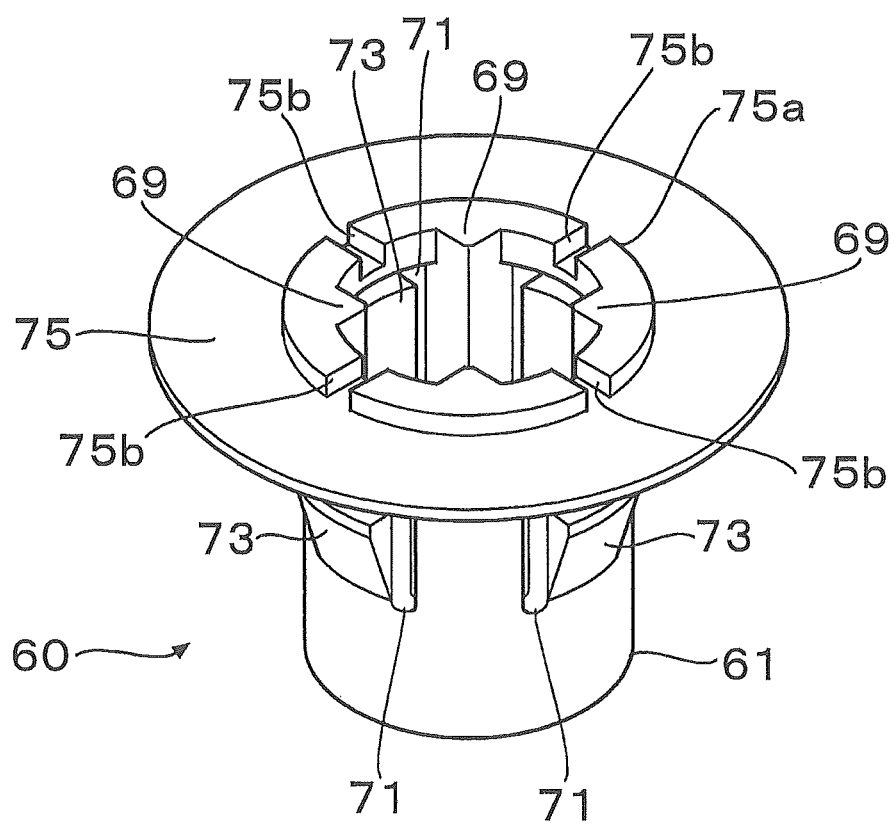
FIG. 13 is a perspective view of a fastener which makes up a further embodiment of a vehicle opening/closing member damper apparatus and a vehicle opening/closing member stopper apparatus according to the invention.
Figure 14A:
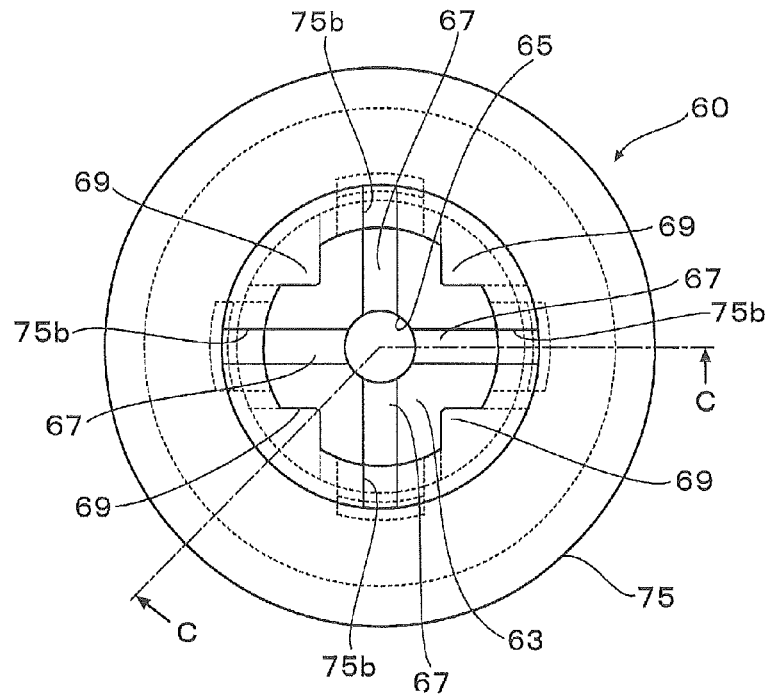
FIGS. 14A and 14B show the fastener which makes up the damper apparatus and the stopper apparatus.
Figure 14B:
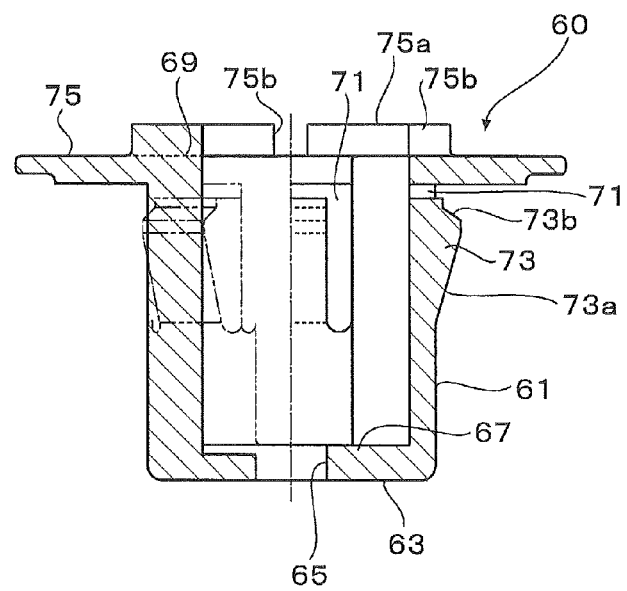
Figure 15:
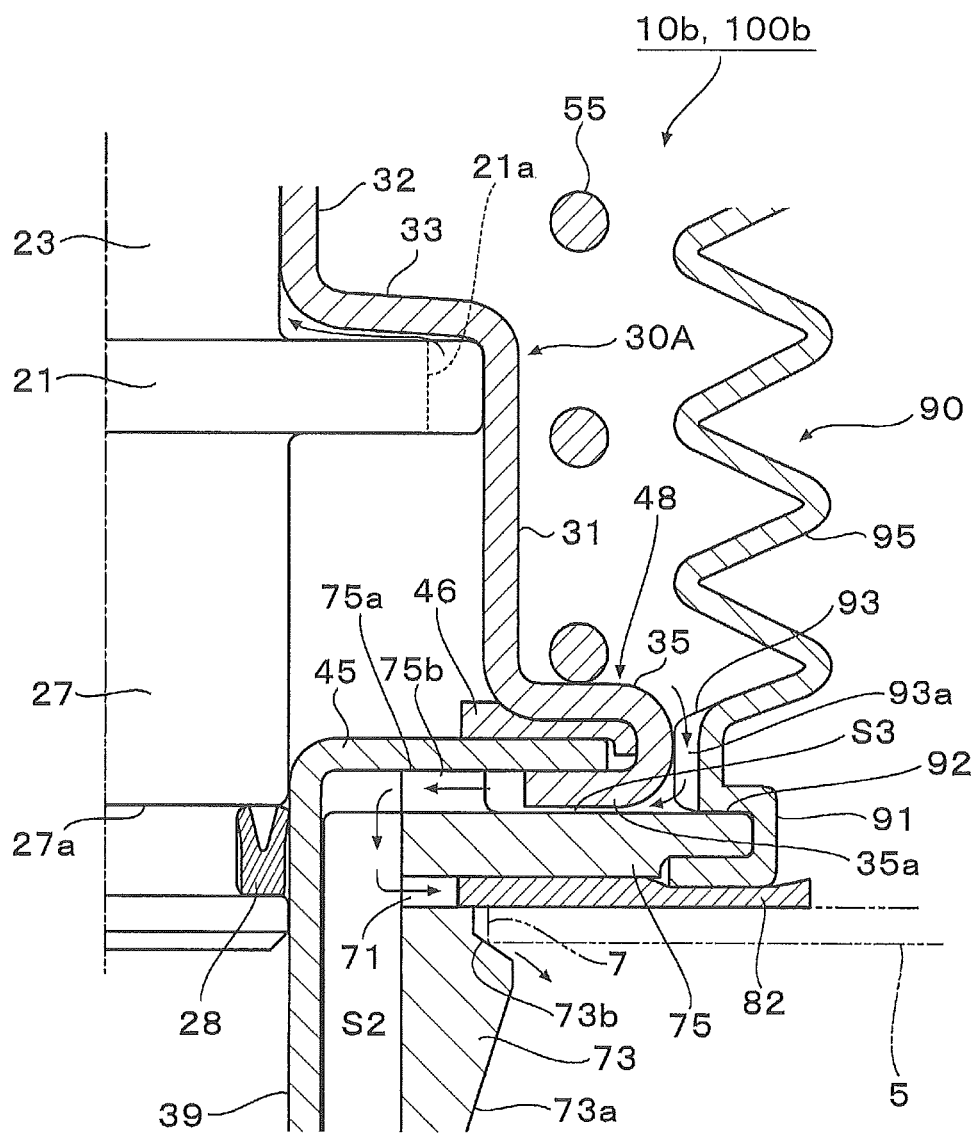
FIG. 15 is an explanatory diagram showing a main part of the damper apparatus and the stopper apparatus.

FIGS. 13 to 15 show a further embodiment of a vehicle opening/closing member damper apparatus and a vehicle opening/closing member stopper apparatus according to the invention. Like reference numerals will be given to like constituent components of the previous embodiment, and the description thereof will be omitted.

A vehicle opening/closing member damper apparatus 10b ("damper apparatus 10b") and a vehicle opening/closing member stopper apparatus 100b ("stopper apparatus 100b") according to this embodiment differ from those of the previous embodiment, as a second flange portion 35 of a second body 30B making up a cylinder 30 to be abutted by a piston main body 21 indirectly abuts a circumferential edge of an attachment hole 7 in an opening/closing member 5 via a third flange portion 75 of a fastener 60 (see FIG. 15).

As shown in FIGS. 13, 14A and 14B, in this fastener 60, a circumferential edge of an opening portion in the third flange portion 75 projects to a predetermined height. When the fastener 60 is fixed to the cylinder 30 via a rivet 80, the projecting portion 75a abuts and supports a second flange portion 45 of a second body 30B (see FIG. 15). Thus, the second flange portion 45 of the second body 30B indirectly abuts a circumferential edge on a front side of the attachment hole 7 via the third flange portion 75 of the fastener 60 and a seal member 82.

Plural air passage grooves 75b are formed radially in the projecting portion 75a while being aligned with cross-shaped projecting portions 67 on the bottom portion 63 (see FIGS. 13, 14A and 14B). As shown in FIG. 15, these air passage grooves 75b communicates with a gap S3 and a gap S2, and air in an interior of a cover member 90 is allowed to pass therethrough after it has passed through air releasing grooves 93a and the gap S3.

In this embodiment, since the second flange portion 45 of the second body 30B is supported by the projecting portion 75a of the third flange portion 75 of the fastener 60, even when a piston rod 23 is pushed in towards the second body 30B against a biasing force of a coil spring 55 and the piston main body 21 abuts the second flange portion 45 indirectly via a gasket 46 or directly, the deformation of the second flange portion 45 can be prevented.

In addition to the above-described embodiments, for example, a configuration may be adopted in which ribs are provided at the circumferential edge of the opening portion of the third flange portion 75 of the fastener 60, so that the ribs abut and support the second flange portion 45 of the second body 30B when the fastener 60 is fixed to the cylinder 30 via the rivet 80, and thus, any construction may be adopted as long as it supports the second flange portion 45.

In the above-described embodiments, while the seal member 82 is disposed on the rear side of the third flange portion 75 of the fastener 60, the seal member 82 may be omitted, so that the second flange portion 45 of the second body 30B may indirectly abut the attachment hole 7 via the third flange portion 75 of the fastener 60. The fastener 60 itself may not be used, so that the second flange portion 75 of the second body 30B may directly abut the attachment hole 7.

BRIEF DESCRIPTION OF REFERENCE NUMERALS 3 opening portion; 5 opening/closing member; 7 attachment hole; 10, 10a, 10b vehicle opening/closing member damper apparatus (damper apparatus); 100, 100a, 100b vehicle opening/closing member stopper apparatus (stopper apparatus); 15 stopper main body; 20 piston; 21 piston main body; 23, 27 piston rod; 25 distal end portion; 30 cylinder; 30a cylinder main body; 32 second cylindrical portion (the other of cylindrical portions); 39 third cylindrical portion (one of cylindrical portions); 41 bottom portion; 43 air releasing hole; 60 fastener; 63 bottom portion; 65 through hole; 67 projecting portion; 69 elongated projection; 71 slit; 73 engagement claw; 75 third flange portion; 90 cover member; 93a air releasing groove.

The invention claimed is:

1. A vehicle opening/closing member damper apparatus which is disposed between an opening portion provided in a vehicle and an opening/closing member attached to the opening portion for preventing a vibration of the opening/closing member upon its closure, the vehicle opening/closing member damper apparatus including:
   a piston comprising a flange-shaped piston main body and a pair of piston rods which project respectively from both end faces of the piston main body;
   a cylinder comprising a cylinder main body which accommodates the piston main body slidably and cylindrical portions which are provided at both end portions of the cylinder main body so as to be opposite with each other and which support respectively the pair of piston rods slidably, an interior of the cylinder being filled with a viscous fluid;
   a fastener which is attached to one of the cylindrical portions to secure the cylinder to one of a circumferential edge of the opening portion and the opening/closing member; and
   an elastic member which biases so that one of the piston rods projects from an other of the cylindrical portions and a distal end portion of the piston rod abuts an other of the circumferential edge of the opening portion and the opening/closing member.

2. The vehicle opening/closing member damper apparatus of claim 1, wherein the fastener includes:
   an accommodating cylindrical portion which accommodates and fixes the one of the cylindrical portions and which is inserted into an attachment hole provided in the circumferential edge of the opening portion or the opening/closing member; and
   a fixing member which is provided on an outer circumference of the accommodating cylindrical portion and which engages with the attachment hole.

3. The vehicle opening/closing member damper apparatus of claim 2, wherein an air releasing hole is formed in a bottom portion of the one of the cylindrical portions which is accommodated in the accommodating cylindrical portion of the fastener.

4. The vehicle opening/closing member damper apparatus of claim 2, wherein plural elongated projections project from an inner circumference of the accommodating cylindrical portion of the fastener so as to extend in an axial direction at plural portions in a circumferential direction,
   wherein plural engagement claws are provided on an outer circumference of the accommodating cylindrical portion via slits at portions situated between the plural elongated projections, so as to be engaged with a circumferential edge on a rear side of the attachment hole, and
   wherein the engagement claws make up the fixing member.

5. The vehicle opening/closing member damper apparatus of claim 1, wherein the fastener includes:
   a flange portion which is engaged with a circumferential edge on a front side of an attachment hole provided in the circumferential edge of the opening portion or the opening/closing member; and
   an insertion portion which is inserted into the attachment hole and engaged with a circumferential edge on a rear side of the attachment hole, and
   wherein there is provided an expandable/contractable cover member which covers a portion of the cylinder projecting from the front side of the attachment hole and which is joined to the flange portion of the fastener, so that air inside the cover member is allowed to communicate from the insertion portion to an exterior of the fastener on the rear side of the attachment hole through a gap between the cylinder and the fastener when the cover member is expanded or contracted.

6. The vehicle opening/closing member damper apparatus of claim 5, wherein, when the one of the cylindrical portions is fixed to the fastener, a gap is defined between the flange portion and a portion of the cylinder facing the flange portion, and an air releasing groove is provided between an inner circumference of the cover member and the cylinder, so that air inside the cover member is allowed to communicate with the exterior through the air releasing groove and the gap.

7. The vehicle opening/closing member damper apparatus of claim 4, wherein through holes are formed respectively in a bottom portion of the accommodating cylindrical portion and the bottom portion of the one of the cylindrical portions, and a fixing device is inserted into the through holes to thereby couple the fastener and the cylinder,
   wherein a projecting portion is formed on the bottom portion of the accommodating cylindrical portion of the fastener so as to abut the bottom portion of the one of the cylindrical portions, and
   wherein a gap is defined between the bottom portion of the one of the cylindrical portions and the bottom portion of the accommodating cylindrical portion of the fastener.

8. A vehicle opening/closing member damper apparatus which is disposed between an opening portion provided in a vehicle and an opening/closing member attached to the opening portion for preventing a vibration of the opening/closing member upon its closure, including:
- a piston comprising a flange-shaped piston main body and a pair of piston rods which project respectively from both end faces of the piston main body;
- a cylinder comprising:
  - a first body comprising a first cylindrical portion which accommodates the piston main body slidably and a second cylindrical portion which extends continuously from one end portion of the first cylindrical portion while being reduced in diameter and which supports one of the piston rods slidably; and
  - a second body comprising a third cylindrical portion which is connected to an other end portion of the first cylindrical portion of the first body so as to be opposite to the second cylindrical portion, which is secured to one of the circumferential edge of the opening portion and the opening/closing member and which supports an other of the piston rods slidably, an interior of the cylinder being filled with a viscous fluid; and
- an elastic member which biases so that the one of the piston rods projects from the second cylindrical portion of the first body and a distal end portion of the piston rod abuts an other of the circumferential edge of the opening portion and the opening/closing member,
- wherein, when the piston moves towards the second body against the elastic member, the piston main body directly or indirectly abuts the second body so as to restrict a further movement of the piston.

9. The vehicle opening/closing member damper apparatus of claim 8, wherein the first body includes a first flange portion extends from a circumferential edge of the other end portion of the first cylindrical portion which is opposite to the one end portion corresponding to the second cylindrical portion,
- wherein the second body includes a second flange portion which extends from a circumferential edge thereof and which is joined to the first flange portion, and
- wherein, when the piston moves towards the second body against the elastic member, the piston main body directly or indirectly abuts the second flange portion.

10. The vehicle opening/closing member damper apparatus of claim 9, wherein a diameter of one of the first flange portion and the second flange portion is larger than that of an other of the first flange portion and the second flange portion,
- wherein an annular gasket is disposed between the first flange portion and the second flange portion,
- wherein the first body and the second body are coupled together by crimping a circumferential edge of the one of the first flange portion and the second flange portion having the larger diameter, and
- wherein the gasket extends so that an inner circumference thereof abuts an outer circumference of the piston.

11. The vehicle opening/closing member damper apparatus of claim 9, wherein the second flange portion of the second body directly or indirectly abuts a circumferential edge of an attachment hole provided in the circumferential edge of the opening portion or the opening/closing member.

12. The vehicle opening/closing member damper apparatus of claim 9, wherein a washer plate is attached to an end portion of the one of the piston rods projecting from the second cylindrical portion of the first body so as to abut the other of the circumferential edge of the opening portion and the opening/closing member, and
- wherein the elastic member comprises a coil spring one end of which is supported by the washer plate and an other end of which is supported by the first flange portion of the first body.

13. The vehicle opening/closing member damper apparatus of claim 12, wherein the washer plate does not abut the second cylindrical portion of the first body even when the piston main body abuts the second body via the gasket.

14. The vehicle opening/closing member damper apparatus of claim 8, further including:
- a fastener which is attached to the second body of the cylinder so as to secure the cylinder to the circumferential edge of the opening portion or the opening/closing member,
- wherein the third cylindrical portion extends longer than the other of the piston rods to define a space portion into which the other of the piston rods is not inserted at a distal end portion thereof, and
- wherein the fastener is secured to an end face of the third cylindrical portion via a fixing device.

15. The vehicle opening/closing member damper apparatus of claim 14, wherein a gap is defined between the other of the piston rods projecting from the other end face of the piston main body and the fixing device even when the piston main body directly or indirectly abuts the second body.

16. The vehicle opening/closing member damper apparatus of claim 8, wherein the first body includes a connection wall which connects the first cylindrical portion and the second cylindrical portion and which is inclined so as to project further in an axial direction as the connection wall extends towards the second cylindrical portion.

17. The vehicle opening/closing member damper apparatus of claim 8, wherein the first body includes a connection wall which connects the first cylindrical portion and the second cylindrical portion and which is inclined so as to be depressed further in an axial direction as the connection wall extends towards the second cylindrical portion.

18. The vehicle opening/closing member damper apparatus of claim 8, further including:
- a fastener which is attached to the second body of the cylinder so as to secure the cylinder to the circumferential edge of the opening portion or the opening/closing member, and
- wherein the fastener comprises:
  - an engagement claw which engages with a circumferential edge on a rear side of an attachment hole provided in the circumferential edge of the opening portion or the opening/closing member; and
  - a flange portion which engages with the circumferential edge on a front side of the attachment hole, and
- wherein a portion of the second body abutted by the piston main body abuts the flange portion of the fastener.

19. A vehicle opening/closing member damper apparatus which is disposed between an opening portion provided in a vehicle and an opening/closing member attached to the opening portion for preventing a vibration of the opening/closing member upon its closure, including:
- a piston comprising a flange-shaped piston main body and a pair of piston rods which project respectively from both end faces of the piston main body;
- a cylinder comprising:
  - a first body comprising a first cylindrical portion which accommodates the piston main body slidably, a second cylindrical portion which extends continuously from one end portion of the first cylindrical portion while being reduced in diameter and which supports one of the piston rods being inserted therethrough and a first flange portion which extends from a circumferential edge of an other end portion of the first cylindrical portion; and a second body comprising a third cylindrical portion which supports an other of the piston rods being inserted therethrough and a second flange portion which extends from a circumferential edge of one end portion of the third cylindrical portion to be joined to the first flange portion and which is secured to one of the circumferential edge of the opening portion and the opening/closing member, an interior of the cylinder being filled with a viscous fluid; and a coil spring which biases so that the one of the piston rods projects from the second cylindrical portion of the first body and a distal end portion of the piston rod abuts an other of the circumferential edge of the opening portion and the opening/closing member, wherein the coil spring is disposed on an outer circumference of the cylinder such that one end of the coil spring is supported by abutting a joint portion of the first flange portion and the second flange portion while an other end of the coil spring is supported on a distal end portion side of the piston rod projecting from the second cylindrical portion.

20. The vehicle opening/closing member damper apparatus of claim 19, wherein the first flange portion and the second flange portion of the cylinder are crimped to be joined together.

21. The vehicle opening/closing member damper apparatus of claim 20, wherein a diameter of the first flange portion is larger than that of the second flange portion, and wherein the first flange portion and the second flange portion are joined together by crimping a circumferential edge portion of the first flange portion.

22. The vehicle opening/closing member damper apparatus of claim 19, wherein the first body includes a connection wall which connects the first cylindrical portion and the second cylindrical portion, and the connection wall has an inclined shape.

23. A vehicle opening/closing member damper apparatus which is disposed between an opening portion provided in a vehicle and an opening/closing member attached to the opening portion for restricting a rotation of the opening/closing member and for preventing a vibration of the opening/closing member upon its closure, including:

an expandable/contractable stopper main body, including:
a piston comprising a flange-shaped piston main body and a pair of piston rods which project respectively from both end faces of the piston main body; and
a cylinder comprising a cylinder main body which accommodates the piston main body slidably and cylindrical portions which support respectively the pair of piston rods slidably, an interior of the cylinder being filled with a viscous fluid;

a fastener which secures a proximal end portion of the stopper main body to one of a circumferential edge of the opening portion and the opening/closing member such that a distal end portion of the stopper main body is directed towards other of the circumferential edge of the opening portion and the opening/closing member; and an elastic member which biases so that one of the piston rods projects from an other of the cylindrical portions and a distal end portion of the piston rod abuts the other of the circumferential edge of the opening portion and the opening/closing member, wherein a flange portion which engages with a circumferential edge on a front side of an attachment hole which is provided in the circumferential edge of the opening portion or the opening/closing member and an insertion portion which is inserted into the attachment hole so as to be engaged with a circumferential edge on a rear side of the attachment hole are provided on the fastener, and wherein there is provided an expandable/contractable cover member which covers a portion of the stopper main body projecting from the front side of the attachment hole and which is joined to the flange portion of the fastener, so that air inside the cover member is allowed to communicate from the insertion portion to an exterior of the fastener on the rear side of the attachment hole through a gap between the stopper main body and the fastener when the cover member is expanded or contracted.

24. The vehicle opening/closing member damper apparatus of claim 23, wherein a seal member is disposed on a rear surface side of the flange portion, and wherein an end edge portion of the cover member is joined while being held between the flange portion and the seal member.

25. The vehicle opening/closing member damper apparatus of claim 24, wherein the seal member comprises a foamed material and is made larger than an outside diameter of a joint portion where the cover member is joined to the flange portion.

26. The vehicle opening/closing member damper apparatus of claim 23, wherein the insertion portion includes a cylindrical portion which accommodates the proximal end portion of the stopper main body and which is inserted into the attachment hole, wherein the flange portion is formed at an opening portion of one end of the cylindrical portion, wherein an engagement claw is provided on a side wall of the cylindrical portion via a slit, so as to be engaged with the circumferential edge on the rear side of the attachment hole, and wherein a gap is defined between the stopper main body and the cylindrical portion.

27. The vehicle opening/closing member damper apparatus of claim 26, wherein the proximal end portion of the stopper main body is fixed to a bottom surface of the cylindrical portion of the fastener by a fixing device.

* * * * *